United States Patent
Gentile et al.

(10) Patent No.: US 11,185,769 B2
(45) Date of Patent: *Nov. 30, 2021

(54) MANAGEMENT AND BROADCASTING OF LIVE MULTIPLAYER VIDEO GAME ACTIVITY

(71) Applicant: DAYBREAK GAME COMPANY LLC, San Diego, CA (US)

(72) Inventors: Anthony Joseph Gentile, Carlsbad, CA (US); Jeffrey Alan Ehrman, San Diego, CA (US)

(73) Assignee: DAYBREAK GAME COMPANY LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,143

(22) Filed: Oct. 13, 2020

(65) Prior Publication Data

US 2021/0023447 A1    Jan. 28, 2021

Related U.S. Application Data

(63) Continuation of application No. 16/164,364, filed on Oct. 18, 2018, now Pat. No. 10,857,457.

(60) Provisional application No. 62/574,634, filed on Oct. 19, 2017.

(51) Int. Cl.
*A63F 13/00* (2014.01)
*A63F 9/24* (2006.01)
*A63F 13/352* (2014.01)
*A63F 13/86* (2014.01)
*A63F 13/25* (2014.01)

(52) U.S. Cl.
CPC ............ *A63F 13/352* (2014.09); *A63F 13/25* (2014.09); *A63F 13/86* (2014.09); *A63F 2300/308* (2013.01); *A63F 2300/577* (2013.01)

(58) Field of Classification Search
CPC ........ A63F 13/25; A63F 13/352; A63F 13/86; A63F 2300/308; A63F 2300/577
See application file for complete search history.

(56) References Cited

U.S. PATENT DOCUMENTS

| | | | |
|---|---|---|---|
| 7,632,186 B2 | 12/2009 | Spanton et al. | |
| 8,025,572 B2 | 9/2011 | Spanton et al. | |
| 9,573,062 B1 * | 2/2017 | Long | A63F 13/5255 |
| 10,857,457 B2 * | 12/2020 | Gentile | A63F 13/25 |

(Continued)

*Primary Examiner* — Milap Shah
(74) *Attorney, Agent, or Firm* — Lorenz & Kopf, LLP

(57) ABSTRACT

A method of managing a live broadcast of multiplayer video game activity operates a multiplayer game server system to provide game data to a plurality of client devices, the game data defining a multiplayer video game environment that includes a plurality of game characters. The game server system receives a character identifier corresponding to a targeted game character, determines that a currently active altercation in the multiplayer video game environment involves the targeted game character and an opponent game character, and communicates altercation data to a client device operating in a spectator mode. The altercation data includes first gameplay attributes to display with a first user interface (UI) element associated with the targeted game character, and second gameplay attributes to display with a second UI element associated with the opponent game character.

16 Claims, 11 Drawing Sheets

(56) References Cited

U.S. PATENT DOCUMENTS

| | | |
|---|---|---|
| 2003/0038805 A1* | 2/2003 | Wong ................. A63F 13/12 345/473 |
| 2006/0058103 A1 | 3/2006 | Danieli et al. |
| 2007/0117635 A1* | 5/2007 | Spanton ............... A63F 13/12 463/43 |
| 2013/0288799 A1* | 10/2013 | Harris ................ A63F 13/86 463/42 |
| 2014/0018165 A1 | 1/2014 | Kern et al. |
| 2014/0113718 A1* | 4/2014 | Norman ............. A63F 13/497 463/31 |
| 2017/0001111 A1 | 1/2017 | Willette et al. |
| 2017/0001112 A1 | 1/2017 | Gilmore et al. |
| 2017/0001122 A1 | 1/2017 | Leung et al. |
| 2017/0003784 A1 | 1/2017 | Garg et al. |
| 2017/0006074 A1 | 1/2017 | Oates, III |
| 2017/0006322 A1 | 1/2017 | Dury et al. |
| 2017/0212771 A1 | 7/2017 | Weissberg et al. |

* cited by examiner

MANAGEMENT AND BROADCASTING OF LIVE MULTIPLAYER VIDEO GAME ACTIVITY

CROSS-REFERENCE TO RELATED APPLICATION

This application is a continuation of U.S. patent application Ser. No. 16/164,364, filed Oct. 18, 2018, which claims the benefit of U.S. provisional patent application No. 62/574,634, filed Oct. 19, 2017.

TECHNICAL FIELD

Embodiments of the subject matter described herein relate generally to entertainment and media delivery services. More particularly, embodiments of the subject matter relate to techniques, systems, and technologies related to the broadcast of multiplayer video game activity, including live streaming of such video game activity, production and editing of the video game feeds generated by the client/player systems, and the like.

BACKGROUND

Multiplayer video games, such as massively multiplayer online (MMO) games have become extremely popular. An MMO game relies on a centralized game server system or architecture to support a large number of players. The players utilize respective client devices that are in data communication with the game server system, wherein the client devices run client-side game software that renders the graphical content in response to real-time game data received from the game server system. In this regard, MMO games provide virtual software environments where users can interact with each other through virtual player characters. The player characters can also interact with non-player characters (NPCs), objects, and geometric structures within the virtual game environment.

"Battle royale" games are multiplayer games (often implemented as MMO games) where a large number of players engage each other with the goal of being the last remaining survivor. A typical battle royale game begins with players on a basic and level playing field with little to no resources, weapons, equipment, food, etc. As the game progresses, players attempt to collect items and attributes to help them survive, engage in altercations with one another, etc. Moreover, the virtual battlefield may shrink as time progresses to ensure that the remaining players are forced to interact with one another.

Battle royale games are often featured in eSports competitions and broadcasts because they are action-packed, include many altercations and kills, and can be designed to have a well-defined or easy-to-estimate duration. However, producing a live single-screen broadcast of a battle royale game (and other MMO games) can be extremely challenging, especially at or near the beginning of the gameplay when hundreds or thousands of players are still active and interacting with one another. In this regard, an eSports broadcast typically includes a video feed that corresponds to the perspective of one player character (PC) or that follows the movement of one PC for purposes of showing an exciting or interesting altercation, a battle, a critical in-game discovery, an action-packed episode (e.g., a car chase, an earthquake, an explosion, or the like), or the elimination of an opposing PC. In practice, however, there can be a large number of interesting events, PCs, or altercations ongoing at any given time within a virtual battle royale environment.

One proposed approach to broadcasting a live battle royale game uses a brute force methodology, where many (or all) PCs are monitored and/or where many (or all) ongoing altercations are monitored by a director or producer for purposes of selecting the content to be shown during the broadcast at any given time. Although a brute force approach is feasible, it is neither efficient nor realistically implementable in an MMO game having a large number of participants. Another proposed approach to broadcasting a live battle royale game relies on a limited number of human spectators or observers who navigate the virtual landscape, searching for interesting events or PCs to follow. Although this approach is feasible and potentially economical, its effectiveness is limited to the number of spectators that are available to view and navigate the game environment. For example, if only three human observers are available to monitor an MMO game having thousands of PCs and NPCs interacting at the same time, it will be difficult if not impossible to identify and cover all of the interesting events occurring at any given moment.

Accordingly, it is desirable to have a system and related methodology that addresses the shortcomings of the proposed approaches mentioned above. Furthermore, other desirable features and characteristics will become apparent from the subsequent detailed description and the appended claims, taken in conjunction with the accompanying drawings and the foregoing technical field and background.

BRIEF SUMMARY

A method of managing a live broadcast of multiplayer video game activity is disclosed here. An exemplary embodiment of the method includes the steps of: operating a computer-based multiplayer game server system to provide game data to a plurality of computer-based client devices, the game data defining a multiplayer video game environment that includes a plurality of game characters; receiving, at the computer-based multiplayer game server system, a character identifier corresponding to a targeted game character; determining that a currently active altercation in the multiplayer video game environment involves the targeted game character and an opponent game character; and communicating altercation data from the computer-based multiplayer game server system to a computer-based client device operating in a spectator mode. The altercation data includes first gameplay attributes to display with a first user interface (UI) element associated with the targeted game character, and second gameplay attributes to display with a second UI element associated with the opponent game character.

A computer-based multiplayer game server system is also disclosed. An exemplary embodiment of the game server system includes a memory element and a processor device communicatively coupled to the memory element, the memory element having computer executable instructions stored thereon and configurable to be executed by the processor device to cause the computer-based multiplayer game server system to: provide game data to a plurality of computer-based client devices, the game data defining a multiplayer video game environment that includes a plurality of game characters; receive a character identifier corresponding to a targeted game character; determine that a currently active altercation in the multiplayer video game environment involves the targeted game character and an opponent game character; and communicate altercation data to a computer-based client device operating in a spectator mode. The altercation data includes first gameplay attributes to display with a first user interface (UI) element associated with the targeted game character, and second gameplay attributes to display with a second UI element associated with the opponent game character.

Also disclosed is a system of managing a live broadcast of multiplayer video game activity. An exemplary embodiment of the system includes: a computer-based multiplayer game server system configured to provide game data to a plurality of computer-based player devices, the game data defining a multiplayer video game environment that includes a plurality of game characters; and a plurality of computer-based spectator devices in data communication with the multiplayer game server system. The game server system is configured to: receive a first character identifier corresponding to a first targeted game character that has been selected by a first spectator device of the plurality of spectator devices; receive a second character identifier corresponding to a second targeted game character that has been selected by a second spectator device of the plurality of spectator devices; communicate first altercation data to the first spectator device, the first altercation data associated with a first currently active altercation in the multiplayer video game environment that involves the first targeted game character and a first opponent game character; and communicate second altercation data to the second spectator device, the second altercation data associated with a second currently active altercation in the multiplayer video game environment that involves the second targeted game character and a second opponent game character. The first spectator device is configured to: receive the first altercation data and, in response thereto, display a first dynamic user interface (UI) element and a second dynamic UI element in a first gameplay feed, wherein the first dynamic UI element includes updateable gameplay attributes of the first targeted game character, and wherein the second dynamic UI element includes updateable gameplay attributes of the first opponent game character. The second spectator device is configured to: receive the second altercation data and, in response thereto, display a third dynamic UI element and a fourth dynamic UI element in a second gameplay feed, wherein the third dynamic UI element includes updateable gameplay attributes of the second targeted game character, and wherein the fourth dynamic UI element includes updateable gameplay attributes of the second opponent game character.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
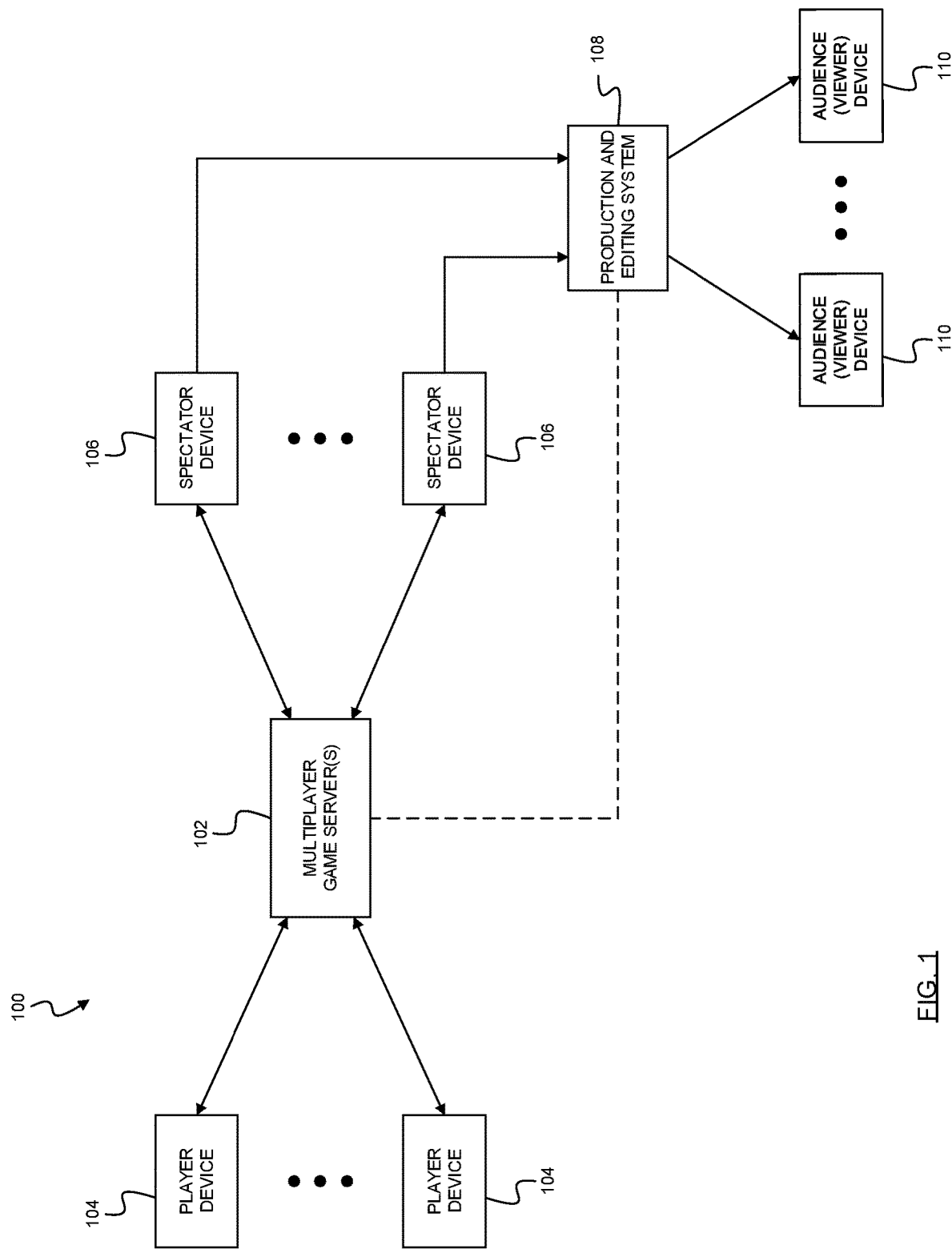
FIG. 1 is a schematic block diagram of a typical environment suitable for use with a video game presentation system according to an exemplary embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The subject matter disclosed here relates to a system and related operating methodologies for managing, producing, broadcasting, and presenting video content associated with gameplay during a live multiplayer video game session or event. The non-limiting exemplary embodiment described herein is suitably designed for compatibility with a multiplayer "battle royale" type of video game, wherein many player characters (as individuals or grouped into teams) battle each other with the endgame goal of being the last surviving player character (or team).

The popularity of video gaming has spawned interest in "eSports" broadcasts, where video game matches are streamed, televised, or otherwise broadcast to an audience.

Such eSports broadcasts usually show the point of view of different player characters (PCs) or non-player characters (NPCs) during the gameplay session, and/or gameplay action from the perspective of virtual cameras that need not correspond to a character's point of view. One of the challenges of streaming an eSports match with a large number of player participants, or with a large virtual playing area or map, is determining how to present the match in a way that is entertaining and understandable to the viewing audience. For example, it is neither realistic nor effective to show all player characters at once because there are too many of them and many player characters will be inactive, hiding out, or relatively dormant at any given time. Although it is possible to have one virtual camera focused on each active player character, it would still remain very difficult to monitor all of the virtual cameras for purposes of selecting the appropriate content to present to the viewing audience.

Moreover, the viewing audience will be most interested in watching action-packed scenarios, good fights and battles, and strategic maneuvers as they materialize. There are also certain entertainment factors to be considered—who has lots of kills, who's driving a vehicle, who's barely alive, who has the best weapons, etc., all of which can impact a decision concerning where on the gameplay map a given virtual camera should be focused, and what kinds of fights or scenarios should be streamed or broadcast at any given moment. Moreover, the viewing audience might be particularly interested in famous eSports celebrities, professionals, and/or highly skilled players, which can influence decisions regarding which virtual camera view to broadcast to the audience at any given time.

To this end, the system and methodologies described herein have been developed to address the concerns and shortcomings mentioned above. For simplicity, the system is referred to below as the video gameplay presentation system. Although the exemplary embodiment is described in the context of a multiplayer battle or combat game that simultaneously supports many player characters, the inventive subject matter is not limited or restricted to such an application. That said, the video gameplay presentation system is suitably designed and configured such that certain benefits and advantages are realized when utilized with such a multiplayer combat game.

To summarize, the video gameplay presentation system leverages real-time, stateful, and historical data, and appropriate processing algorithms, to dynamically present player state and current or anticipated combat visualization between two or more opponents (and, as applicable, their teams) through in-game user interface (UI) elements in a "Battle Royale" style match. The system dynamically and selectively presents combat between two or more player characters in a multiplayer combat match, which is in contrast to traditional "brute force" methodologies that statically display all player characters or all team members. Such brute force methods are efficient and effective in combat games that include a limited number of participants, but are impractical for a Battle Royale application having a large number of player characters.

The video gameplay presentation system is suitably designed for the one-vs-one, one-vs-many, and many-vs-many (i.e., any-vs-any) nature of Battle Royale matches, but it may also have broader applicability for other types of video games and game modes.

The ability to view the desirable gameplay information has applicability to virtual camera operators, eSports/game commentators, and viewers of the game (via television, live stream, video on demand, and the like).

Turning to the drawings, FIG. 1 is a simplified schematic block diagram of a typical computer-based environment suitable for use with a video game presentation system 100 that is designed and configured in accordance with an exemplary embodiment of the invention. The system 100 can be employed to manage a live broadcast of multiplayer video game activity to a viewing audience.

The illustrated embodiment of the system 100 generally includes, without limitation: one or more computer-based multiplayer game servers 102 that cooperate to support and provide the functionality described herein (for simplicity, the following description refers to only one multiplayer game server 102 even though any number of distributed and networked hardware components may cooperate with one another to form a multiplayer game server system); at least one computer-based player device 104—typically a large number of player devices 104, each associated with one of many player-users supported by the system 100; at least one computer-based spectator device 106; at least one computer-based production and editing system 108; and a number of computer-based audience (viewer) devices 110. The various systems and devices in the system 100 are suitably configured to communicate and/or cooperate with one another as needed, by way of one or more communication networks (not shown) that support data communication between the various components in the depicted environment. To this end, the system 100 may include or cooperate with any suitably configured and arranged data communication network, or a combination of networks. For example, the system 100 may include or cooperate with any one or any combination of a LAN (local area network), WAN (wide area network), telephone network, wireless network, point-to-point network, satellite network, short range wireless link, or the like.

It should be appreciated that a practical implementation of the system 100 may include additional devices, components, subsystems, and elements configured to support conventional features and functions (which will not be described herein).

The multiplayer game server 102 can be realized using one or more computer-implemented components (which may be arranged in a physically distributed configuration or co-located if so desired). The multiplayer game server 102 is suitably designed, configured, and programmed to support the various functions, processes, and tasks described in more detail below. In this regard, the multiplayer game server 102 can include a plurality of logical and/or physically distinct modules or processing components that perform various functions such as, without limitation: user account creation and management; user/subscriber authentication; cooperating and communicating with the player devices 104, the spectator devices 106, and the production and editing system 108 (as needed) to create, update, and render the multiplayer game play environment and associated GUI elements by providing corresponding game data to the respective devices; cooperating and communicating with the spectator devices 106 to obtain gameplay feeds of interest; cooperating and communicating with the production and editing system 108 to provide gameplay feeds of interest and related video gameplay content; and the like.

The multiplayer game server 102 can support any number of player devices 104, any number of spectator devices 106, and any number of audience devices 110 (as indicated by the ellipses in FIG. 1). Each player device 104, spectator device 106, and audience device 110 is implemented as a computer-based hardware component. The production and editing system 108 is also implemented as one or more computer-based hardware components. Thus, each of these devices can be realized as any type personal computer, mobile telephone, tablet, wearable device, gaming device, digital media player device, entertainment device, or other network-enabled electronic device that includes or cooperates with a display element.

A computer-based or computer-implemented device or system in the system 100 generally includes, without limitation: at least one processor device; at least one memory element; a display element; at least one communication (network) interface; and input and output (I/O) devices. In practice, a computer-based device in the system 100 can include additional components, elements, and functionality that may be conventional in nature or unrelated to the core functionality of the inventive subject matter described herein.

A processor device utilized by a computer-based system or device may be, for example, a central processing unit (CPU), a field programmable gate array (FPGA), a microcontroller, an application specific integrated circuit (ASIC), or any other logic device or combination thereof. The memory element is communicatively coupled to the processor device, and it can be implemented with any combination of volatile and non-volatile memory. The memory element has non-transitory computer-executable instructions (program code) stored thereon, wherein the instructions are configurable to be executed by the processor device as needed. When executed by the processor device, the instructions cause the processor device to perform the associated tasks, processes, and operations defined by the instructions. Of course, the memory element may also include instructions associated with a file system of the host device and instructions associated with other applications or programs. Moreover, the memory element can serve as a data storage unit for the host device.

The display element may be integrated with the device or coupled to the device as a peripheral. The shape, size, resolution, and technology of the display element will be appropriate to the particular implementation of the device. The display element can be realized as a monitor, screen, or another conventional electronic display that is capable of graphically presenting data and/or information provided by the device. In certain embodiments, the display element is a touch-enabled display (e.g., of the type commonly used with mobile phones).

The communication interface represents the hardware, software, and processing logic that enables the device to support data communication with other devices, via the network. In practice, the communication interface can be suitably configured to support wireless and/or wired data communication protocols as appropriate to the particular embodiment. For example, if the device is a smartphone, then the communication interface can be designed to support a cellular communication protocol, a short-range wireless protocol (such as the BLUETOOTH communication protocol), and a WLAN protocol. As another example, if the device is a desktop or laptop computer, then the communication interface can be designed to support the BLUETOOTH communication protocol, a WLAN protocol, and a LAN communication protocol (e.g., Ethernet).

The I/O devices enable the user of the device to interact with other devices or components as needed. In practice, the I/O devices may include, without limitation: a speaker; a haptic feedback device; a microphone; a mouse or other pointing device; a touchscreen or touchpad device; a keyboard; a joystick; or any conventional peripheral device. In this context, the display element can be categorized as an I/O device.

As mentioned above, the multiplayer game server 102 hosts and manages a multiplayer combat-themed video game that can involve a large number of players who interact via their respective player devices 104. To this end, the game server system is suitably configured to provide game data to the player devices 104 in an ongoing and real-time manner, wherein the game data defines a multiplayer video game environment that includes a plurality of different game characters. The system 100 is designed and arranged to provide live (or virtually real-time) coverage of the gameplay to the users of any number of audience devices 110. The content (e.g., a gameplay feed) provided to the users can be selected, produced, edited, and/or otherwise managed by the production and editing system 108 (which may be a physically distinct hardware system or a logical module or processing component of the multiplayer game server 102). In contrast to conventional methodologies that monitor the feeds from each player device 104, the multiplayer game server 102 is designed and configured to intelligently identify and efficiently select only certain gameplay feeds of interest. The identified/selected feeds of interest can then be provided to the production and editing system 108 for review and final production before the streaming or broadcast content is provided to the viewing audience.

The spectator devices 106 are in data communication with the multiplayer game server 102 to identify or provide the feeds of interest. In accordance with certain embodiments, each spectator device 106 is manned by a human operator (although at least some of the tasks, such as including targeting/selecting a player for display of relevant information, can be automated if so desired). The operator can manipulate the respective spectator device 106 as needed to do some or all of the following, without limitation: navigate the virtual game environment; select/target a specific player character of interest as the focal point of the gameplay feed; change the virtual camera perspective (e.g., the point of view of a targeted/selected player character, an aerial view from a non-player perspective, a "hidden camera" view, a rear view or follow view perspective relative to the targeted character, or the like); and identify other potential player character targets, areas of high activity, ongoing battles or fights, etc., such that the operators of other spectator devices 106 can shift focus if needed, and such that the operator(s) of the production and editing system 108 can review identified feeds for inclusion in the outgoing content. As mentioned above, the system can additionally or alternatively utilize suitably designed algorithms, artificial intelligence, and/or other automated techniques and methodologies in place of (or in support of) some or all of the human-driven operations. In a fully automated implementation, the functionality of the spectator devices 106 can be integrated into the multiplayer game server 102 (or elsewhere if so desired) as a processing module. The example described in more detail below assumes that human operators are stationed at the spectator devices 106.

For the exemplary embodiment described here, the production and editing system 108 is in data communication with each spectator device 106. In some implementations, the production and editing system 108 is also in data communication with the game server 102. Indeed, this disclosure contemplates an implementation that integrates the functionality of the spectator devices 106 into the production and editing system 108, wherein distinct spectator devices 106 are optional. As mentioned above, the production and editing system 108 is suitably configured to receive respective gameplay video feeds from the different spectator devices 106, such that one or more operators can monitor the different feeds in real-time as they are generated by the spectator devices 106. The production and editing system 108 is operated to select one (or perhaps more than one) of the monitored gameplay feeds to serve as the broadcast feed, which is intended for the viewing audience. In other words, the production and editing system 108 is used to select which camera view (or multiple views) will be shown to the broadcast audience. Ideally, the selected gameplay feed will be exciting, interesting, and eye-catching to the audience.

Figure 2:
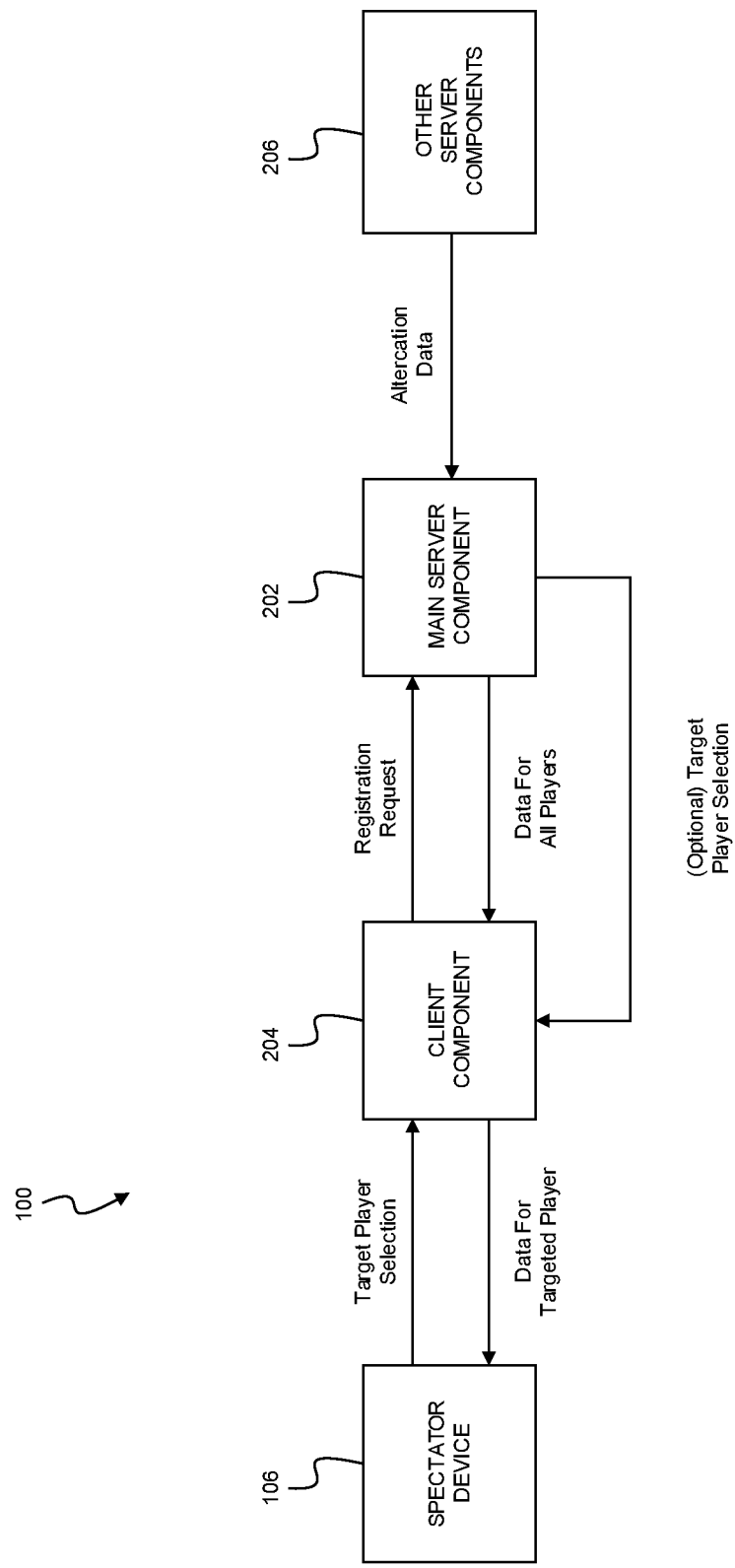
FIG. 2 is a schematic block diagram of a video game presentation system according to an exemplary embodiment of the invention.

FIG. 2 is an alternative schematic block diagram representation of the video game presentation system 100. The implementation shown in FIG. 2 can be deployed in the environment shown in FIG. 1. The system 100 as depicted in FIG. 2 includes, without limitation: a main server component 202 (or module) associated with the multiplayer game server 102; one client component 204 (or module) associated with each spectator device 106; and other server components 206 associated with the multiplayer game server 102. The main server component 202, the client components 204, and the other server components 206 can be realized as logical/processing modules that reside on the respective computer-based devices (the multiplayer game server 102 or the spectator devices 106 in this example). In practice, the client component 204 can be provided with a standard client software package that is intended for installation on client devices, such that any given computer-based client device can function as either a player device 104 or a spectator device 106 if so desired. Moreover, the game server 102 and/or the production and editing system 108 can include a client component 204 (if so desired) to support the features and methodology described herein.

A client component 204 can issue a registration request to the server component 202, wherein the registration request indicates that the issuing device is to be registered for purposes of functioning as a spectator device 106 (rather than as a player device 104). FIG. 2 and this related description assumes that the client component 204 registers its host device as a spectator device 106. The main server component 202 builds, maintains, and continuously updates one or more data objects based on altercations between player characters of the ongoing multiplayer video game. The altercation data can be provided by the other server components 206, which are responsible for monitoring gameplay status data for purposes of flagging and indicating altercations between at least two player characters (e.g., fights, chases, stakeouts, surveillance, and the like). The server component 202 sends the relevant altercation, status, and other game data of interest (for all player characters) to each client component that resides on a registered spectator device 106.

In accordance with a non-automated implementation, the operator of the spectator device 106 selects a target player character (PC) for monitoring and for generation of a corresponding video feed for a particular virtual camera view or viewing perspective. The selection information is processed by the client component 204 in an appropriate manner. For this example, the client component 204 populates a UI element with the relevant status data of the targeted PC. This UI element is rendered for display at the corresponding spectator device 106. The spectator device 106 can also display additional UI elements associated with the status of other PCs who might be interacting with the targeted PC (e.g., communicating, collaborating, fighting, riding in the same vehicle, fighting against a common opponent, or the like).

Thus, even though the main server component 202 can send each client component 204 the status data for all of the active PCs, the client component 204 selectively processes and displays the status data in an intelligent and effective manner, based on the targeted PC and further based on the "action status" or "highlight status" of that targeted PC. For example, if the targeted PC is relatively inactive and there are no other PCs interacting with the targeted PC, then the corresponding spectator device 106 need not display much status information. In contrast, if the targeted PC is in the middle of a fierce gun battle among several teammates and many opposing PCs, then the client component 204 can populate a plurality of different UI elements with relevant status data associated with different teams and multiple PCs. In practice, the operator of the production and editing system 108 will probably choose to disregard the "boring" scenario in favor of the action-packed gun battle, and provide the gun battle feed to the audience devices 110 (see FIG. 1). The video game presentation system 100 makes it easy to identify which PCs are involved in interesting activities, and selectively generates relevant UI elements for inclusion with the spectator device feeds, which in turn can be provided to the viewing audience in an intelligent manner.

In accordance with certain exemplary embodiments, the main server component 202 includes, manages, and/or maintains a suitably formatted altercation data structure for each PC in the match. The altercation data structure for a given PC contains data that is associated with each recent altercation with another PC. The altercation data structure contains various data about the other PC involved in the altercation, and at least some of that data can be displayed on the UI element by the client component 204.

During a gameplay match, whenever an altercation between two PCs is detected, the main server component 202 is notified and creates altercation data structures for the PCs involved in the altercation (if they don't already exist). Periodically, the main server component 202 will analyze all of the altercation data structures and remove those that have become stale (i.e., the conditions that triggered the altercation no longer exist). For example, if the PCs are too far away from each other, or if they haven't hit or fired upon each other for a specific amount of time, then the server component 202 assumes that there is no longer a valid or ongoing altercation of interest between those PCs. The data for the altercation data structures that remain is then updated and sent to the registered client components 204.

When a game client is in "Spectator Mode" it is registered as a spectator device 106 with the main server component 202, and the server component 202 periodically sends altercation data structures to the registered spectator devices 106. The altercation data structures are stored in association with the client component 204. If the altercation UI feature is enabled, the UI system creates a display based on the altercation data structures for the PC that is currently being targeted by that particular spectator device 106. This display changes as the targeted PC is changed, or whenever the main server component 202 sends an update to the altercation data. The screen shots depicted in FIGS. 5-9 include dynamically updated UI elements that convey the altercation data and related information for targeted and opponent game characters.

In practice, the altercation data can be resident at the multiplayer game server 102 and/or persistent (saved to disk by the game server 102), or shared/syndicated (i.e., communicated to other systems or devices, which are not depicted, via an API or similar means). The system 100 utilizes certain rules, criteria, and/or conditions to codify "combat" or "altercation" in the context of gameplay scenarios. This codification enables the system 100 to determine whether or not any given gameplay situation or engagement between game characters represents an "altercation" as defined for purposes of the live broadcasting methodologies described herein. In this regard, the altercation data for the PCs is updated in an ongoing manner during gameplay such that the game server 102 is aware of the real-time status of each PC at any given moment.

Conventional game systems employ, at most, a basic methodology that merely keeps track of which PC caused damage or harm to another PC, when the damage/harm occurred, and to what extent (a "who hurt who" approach). This type of approach is effective to keep track of PC eliminations, and to tally the number of kills/eliminations for the active PCs. Although such a conventional approach might be adequate for some applications, it does not work well for purposes of live broadcasting a battle royale type of game where hundreds or potentially thousands of PCs interact with one another at the outset.

In contrast to the rudimentary approach described above, exemplary embodiments of the system 100 utilize a different, more complex, and "richer" scheme for handling altercation data. In this regard, the system 100 creates, maintains, updates, and deletes (as needed) couplet altercation data objects for interactions between two game characters, wherein each couplet altercation data object corresponds to a particular in-game interaction. For the exemplary embodiment contemplated here, a couplet altercation data object is created and updated for each unique pairing of two game characters who are currently engaged in an altercation (as defined by the criteria used by the system 100). Thus, if Character 1 is the targeted character and Character 2 is an opponent character that is currently engaged in combat with Character 1, then there will be one couplet altercation data object associated with the pairing of Character 1 and Character 2. In other words, the relevant altercation data associated with "Character 1 versus Character 2" will be identical or equivalent to the relevant altercation data associated with "Character 2 versus Character 1"—there is no need to create and maintain two different and redundant couplet altercation data objects for this situation.

The couplet altercation data object includes the altercation data needed to characterize the ongoing altercation between the two characters, regardless of which character is the targeted character. In practice, a couplet altercation data object may include any or all of the following, without limitation: identifiers or names of the two game characters; team names for the game characters; an indication of which character inflicted damage; an indication of which character suffered the damage; the amount of damage inflicted; a timestamp, period of time, or other temporal indication of when the damage occurred; the type of damage inflicted; weapons or equipment used to inflict the damage; and the in-game location of the altercation.

The system 100 employs certain rules regarding how the couplet altercation data objects are managed, saved, ignored, prioritized, removed, etc. For example, if a record (couplet) is generated for an altercation between two characters, the system 100 maintains that record and updates it until: (1) more than a predetermined amount of time (e.g., 20 seconds) has passed since either of the two characters has inflicted/suffered damage; or (2) the characters have moved such that the distance between them is more than a predetermined distance in the game environment. It should be appreciated that the system 100 can utilize additional and/or alternative criteria to determine whether a given couplet altercation data object is maintained or deleted. Notably, these rules codify whether or not the two game characters are still actively engaged in a current altercation (or whether they have disengaged). Accordingly, the system 100 can be efficiently configured such that it maintains the couplet altercation data objects in resident memory for only a limited period of time, not indefinitely. This is particularly useful in a live broadcast of multiplayer video game activity, where currently ongoing altercations and exciting action should be monitored and broadcast to the viewing audience. That said, a suitably configured API can communicate the altercation data if needed for persistent storage (e.g., create a log of the gameplay) if so desired.

EXAMPLES

The dynamically generated and rendered UI elements that display the altercation information can present both actual and anticipated combat information in addition to stateful player information. To present actual combat information, the system 100 keeps track of all combat interactions between all match participants. In accordance with certain embodiments, the system 100 tracks at least the following information: whether Character A dealt or received damage to/from Character B (or their respective vehicles) within the last X seconds, e.g., 20 seconds. If this condition is met and either of the characters are targeted for display by a spectator device 106 (either manually by a user or algorithmically by the system itself), the system 100 will display one UI element for Character A and one for Character B.

The system 100 can display N such UI elements in any one camera view (or feed) for any/all other characters that any given PC is in combat with, i.e., Character A vs. Character B and Character C . . . and Character N. The system 100 may also conditionally display a summary UI element if more than a designated number (such as three) of combatants or teams are involved.

Figure 9:
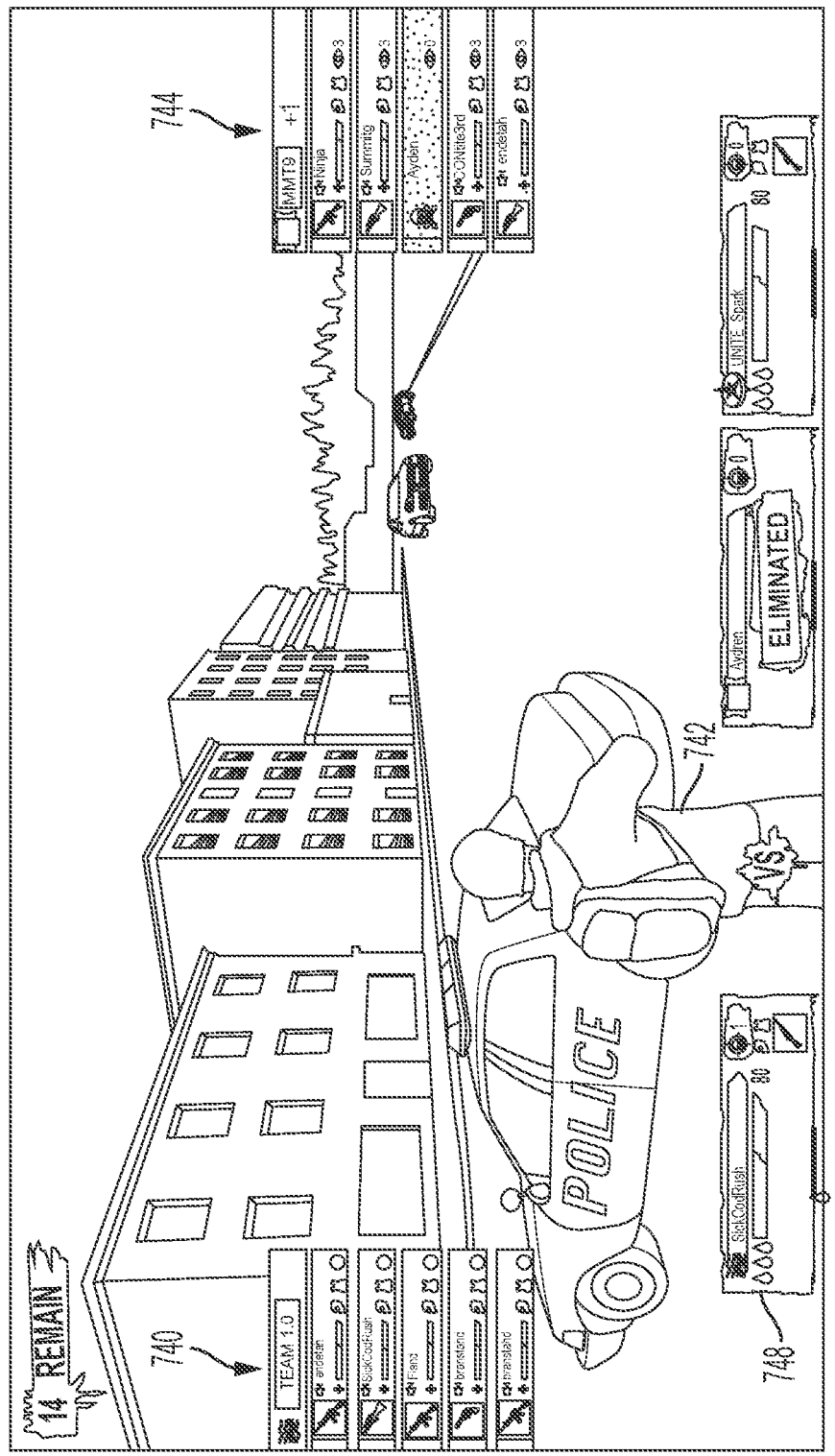

The system 100 also tracks and can present team or group affiliations with any targeted player (see FIG. 9). Displayed information for any given PC can include, but is not limited to: player name and rank; team/group affiliation including name and icon/image; health; bleed state; toxicity; vehicle condition; vehicle fuel level; match kills; equipped items and their states; status effects; abilities; traits; and skills.

In the event a given combatant is killed, the system 100 will display an "eliminated" state. The eliminated state can include information on who killed the PC (which may identify one or any number of other PCs). See FIG. 7 and FIG. 9.

Moreover, the system 100 understands that not all combat results in the elimination of one or more of the combatants and, as such, the system 100 has rules for when it should no longer display information for a given combatant. For this particular implementation, the rules include at least the following: (1) if Character A and Character B have not dealt damage to each other or their vehicles within a certain amount of time, e.g., 20 seconds, consider them to no longer be in combat; (2) if Character A and Character B start combat closer than a designated distance (such as 200 meters) apart from each other and thereafter move such that the distance between them exceeds that threshold, consider them to no longer be in combat.

Note that choosing when to stop displaying information for a combatant is variable based on match state. While the exemplary rules mentioned above apply to the general case, they may be modified based on match time elapsed and/or number of match participants (PCs) remaining. For example, if the system 100 is configured to show unique UI elements for 1v2 players and only three players remain, the system 100 will not stop showing a UI element for combatants based on time-without-damage and combatant distance.

Anticipated Combat

The system 100 can also optionally present anticipated combat between PCs. There are various ways that combat may be anticipated. These techniques are described below.

Raycasting a wielded damage source—If a character is wielding a damage source (i.e., weapon) and raycasting of that weapon's (potential) damage trajectory intersects with another character in the match (conditionally including or ignoring player affiliated teammates/group members), the system 100 can display a UI element for the potential enemy combatant.

Effective range of wielded or inventory item(s)—If a character has damage sources (i.e., weapons) in hand or in his/her inventory that have an effective range sufficient to damage another character in the match (conditionally including or ignoring player affiliated teammates/group members), the system 100 can display a UI element for the potential enemy combatant.

Current game state and historical data—By analyzing a given PC's historical game play (and optionally comparing it to the current game/match state), including character locations, health, equipped and inventory items, etc., the system 100 can predict whether and how a given PC may engage in combat with another character and present information accordingly.

Targeting

While actual and anticipated combat is codified continuously for all match participants, actual display of the UI elements is contingent on a spectator device 106 targeting a given character, typically a PC. Targeting or locking onto a character in this manner enables the system 100 to track and determine who the targeted character actually or may be (anticipated) in combat with. The character can be manually targeted by a user, or algorithmically targeted by the system 100 itself using a suitable methodology.

Manual targeting can be performed at each spectator device 106 by specifying an active PC in a match. For this particular implementation, the targeting controls are defaulted to key bindings (R for nearest player, E for next closest, and Q for previous player), but can be customized by the user and can include clicking to select a player in the virtual world, from a list, with keystrokes, or the like.

For the embodiment presented here, each spectator device 106 can target one game character at a time. In practice, however, a spectator device 106 could target and "follow" any number of different game characters, whether those characters are PCs or NPCs. Moreover, a spectator device 106 can be suitably configured to be capable of targeting anything of interest in the virtual game environment, such as a virtual animal or monster, a piece of equipment or gear, a landmark, a tree, or the like.

Algorithmic targeting can be performed based on an analysis or consideration of any of the following data objects, without limitation:

Health of character(s);
Distance between characters;
Distance between characters and points of interest (POIs);
Weapon fire or damage from, between, or near characters;
Weapons/Equipment looted, wielded, used, in inventory, or dropped by characters;
Vehicles driven by or near character(s);
Number of PCs on a team remaining (alive) in the match;
Number of PCs and/or teams remaining (alive) in the match;
Distance between a character and the current or next safe zone;
Current, recent, or aggregate kills/eliminations; and/or
Stage of the match/game.

Algorithmic targeting can be implemented to automatically and efficiently identify and select targeted PCs. Automatic targeting can be utilized in place of human operators of spectator devices 106, or it can be utilized as a tool to assist human operators. Consequently, a registered spectator device 106 can be: (1) human operated; (2) fully automated; or (3) computer-assisted, wherein the system 100 identifies altercations of interest (e.g., the best or most exciting available battles), the human operator has the ability to select one of the identified altercations or simply accept a default altercation, and thereafter the human can be in control of the virtual camera and able to target game characters involved in that altercation. This hybrid approach recognizes that although the system 100 can identify an interesting altercation, a human operator is better able to monitor the ongoing scene and control the virtual camera view for a broadcast.

Figure 3:
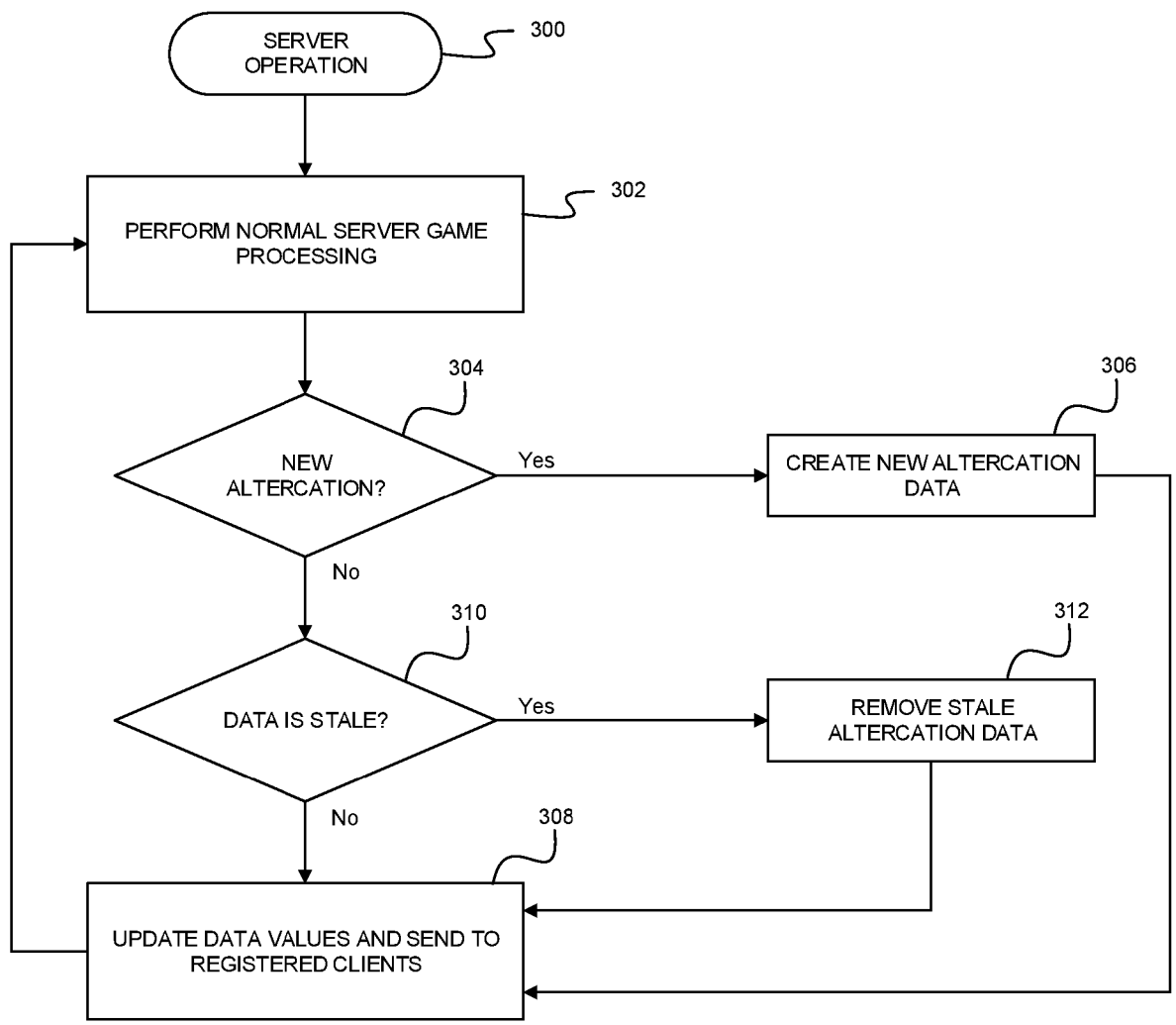
FIG. 3 is a flow chart that illustrates exemplary server-side functionality of the video game presentation system.

FIG. 3 is a flow chart that illustrates exemplary server-side functionality of the video game presentation system. The server operation process 300 shown in FIG. 3 can be performed by the multiplayer game server 102 and, more specifically, the main server component 202. The game server performs normal server game processing (task 302) while monitoring for detected altercations among characters. If a new altercation is detected (the "Yes" branch of query task 304), then new altercation data is created in association with the detected altercation (task 306). Altercation data values are updated as needed, and the data is sent to the registered client components 204 (task 308). The server operation process 300 also checks whether existing altercation data has grown stale (query task 310). If so, the stale altercation data is removed (task 312) and the altercation data values are updated and sent to the registered client components 204 (task 308).

Figure 4:
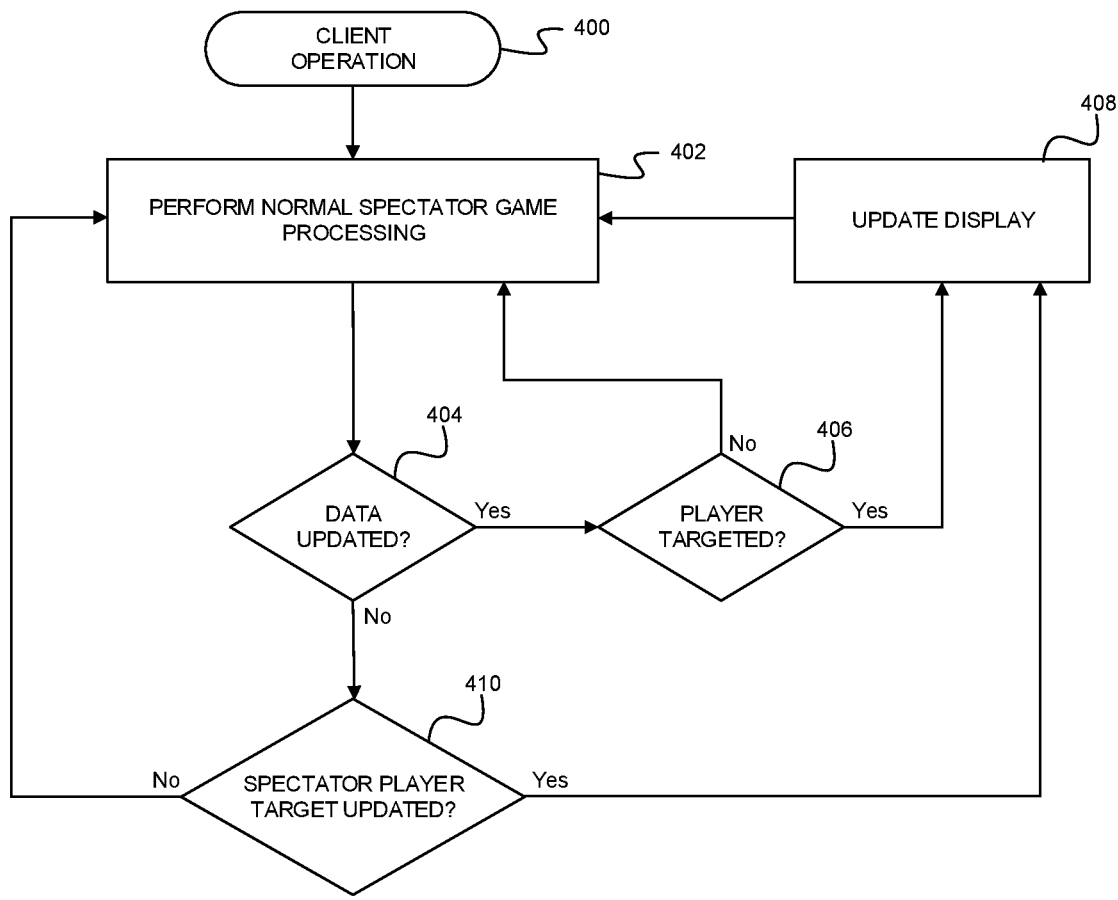
FIG. 4 is a flow chart that illustrates exemplary client-side functionality of the video game presentation system.

FIG. 4 is a flow chart that illustrates exemplary client-side functionality of the video game presentation system. The client operation process 400 shown in FIG. 4 can be performed by each spectator device 106 and, more specifically, by each registered client component 204 that is running on a registered device. The client operation process 400 performs normal spectator game processing (task 402) while monitoring for updated altercation data. If the altercation data has been updated (the "Yes" branch of query task 404) and the corresponding player character is currently targeted (the "Yes" branch of query task 406), then the UI element display is updated in accordance with the new altercation data (task 408). If the updated altercation data is not associated with the currently targeted player character (the "No" branch of query task 406), then the client operation process 400 returns to normal spectator game processing (task 402). The process 400 also monitors for updates to the targeted player character (query task 410). If a new player character is targeted (the "Yes" branch of query task 410), then the UI element display is updated to reflect the new target (task 408). If not, the process 400 returns to normal spectator game processing (task 402).

Exemplary Screen Shots

FIGS. 5-9 are exemplary screen shots generated by an embodiment of the video game presentation system. In these figures, each screen shot corresponds to the camera view of one spectator device 106 in the system 100. This camera view may, but need not, also correspond to the view of one player device 104 in the system 100, i.e., the player device 104 associated with the character targeted by the spectator device 106. In some scenarios, the content viewed at one or more spectator devices 106 may also be displayed at the production and editing system 108, as mentioned above. Accordingly, for these examples, each screen shot represents one still frame of the ongoing gameplay stream as displayed an end device in the system 100.

Figure 5:
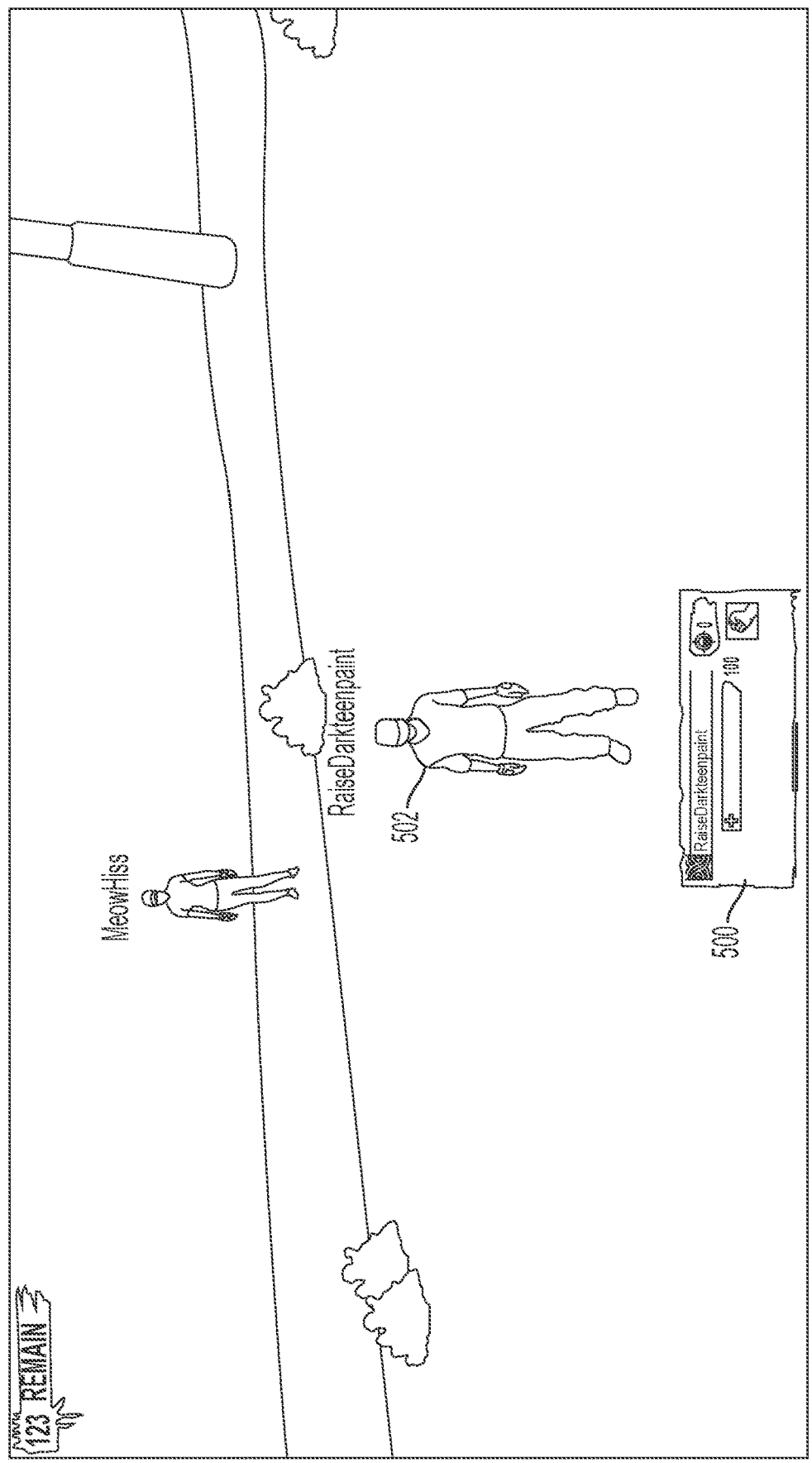
FIGS. 5-9 are exemplary screen shots generated by an embodiment of the video game presentation system.

The screen shot of FIG. 5 includes a UI element 500 with displayed statistics for a targeted player character 502 (i.e., a player character that has been selected as a character of interest to be monitored, followed, or otherwise focused upon during gameplay) in a pre-match lobby scene. The displayed targeted player characteristics include, without limitation: name, rank, kills, equipped weapon(s), and health. Although the UI element 500 is static in FIG. 5, it should be appreciated that the content of the UI element 500, and the PC to which the content of the UI element 500 applies, are dynamic in nature. In this regard, the player characteristics displayed with the UI element 500 dynamically change in response to the selection of a new targeted character (by, e.g., an operator of a spectator device 106), and dynamically change in response to changes in the player characteristics, statistics, and attributes as the gameplay progresses.

Figure 6:
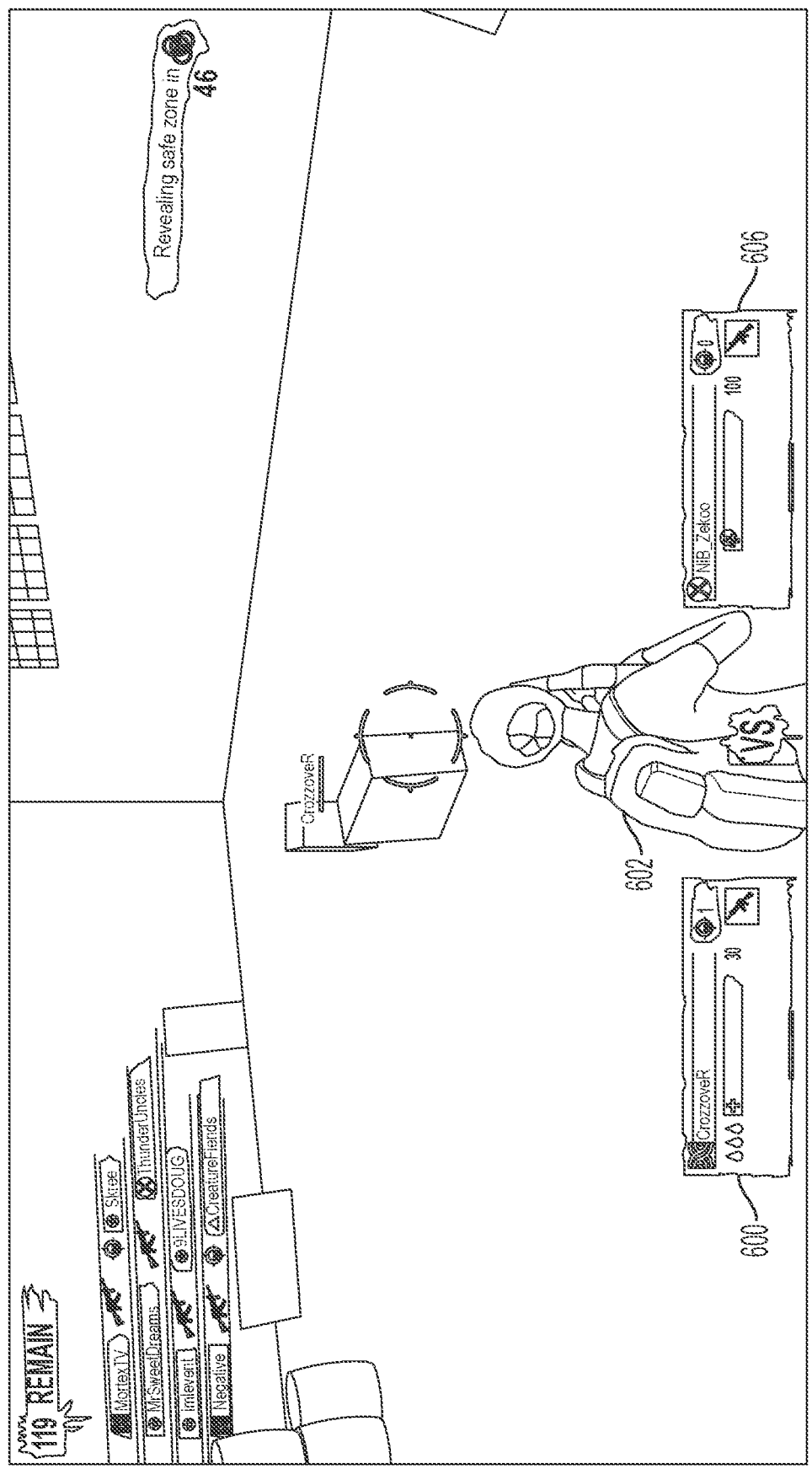

The screen shot of FIG. 6 depicts combat between two player characters. The UI element 600 displays information for a targeted PC 602, which includes bleed state, heal indicator, and one kill. The UI element 606 displays information for a second PC (hidden from view in the screen shot of FIG. 6), which includes an equipped helmet. The displayed information for both PCs includes loaded and inventory ammo for the equipped weapons. Although the UI element 600 is static in FIG. 6, it should be appreciated that the content of the UI element 600, the PC to which the content of the UI element 600 applies, and the presence and content of the UI element 606 are dynamic in nature, as explained above. In particular, the UI element 606 (for the PC that is hidden from view) appears in this screen shot because the two PCs are currently engaged in some type of altercation, combat, etc. If the system 100 determines that the targeted PC 602 is no longer engaged with the other PC, then the UI element 606 automatically disappears. Moreover, if the system 100 determines that the targeted PC 602 becomes involved in an altercation with another PC (e.g., Character Z), then a different UI element with the attributes and player characteristics for Character Z will automatically and dynamically appear alongside the UI element 600 associated with the targeted PC 602.

Figure 7:
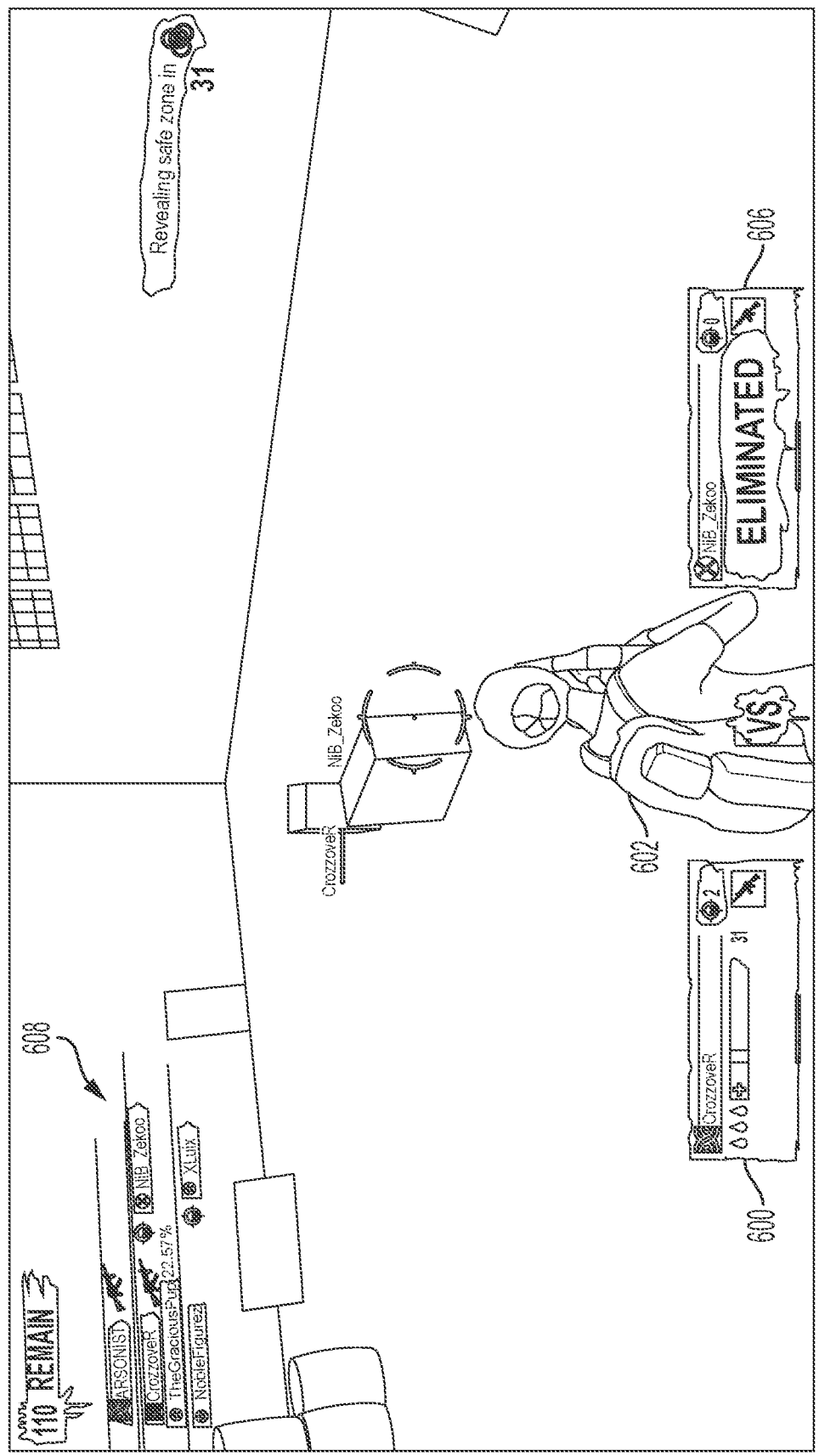

The screen shot of FIG. 7 depicts combat between the same two PCs from FIG. 6, where the targeted PC's opponent (the non-targeted player character) has been eliminated from the game. Notably, the displayed content of the UI element 600 for the targeted PC 602 has been updated with new game data to reflect the current status of the targeted PC 602. Moreover, the UI element 606 for the second PC has been updated with a prominent "ELIMINATED" label to indicate the current status of the second PC. In addition, the name of the eliminated PC, NiB_Zekoo, is now displayed in a region 608 that lists eliminated or recently eliminated PCs. As mentioned previously, the UI elements displayed in association with the PCs (and the content of the region 608) are dynamically updated in real-time to react to the ongoing changes in the gameplay status. Accordingly, the UI element 606 will automatically disappear after a short period of time because that PC has been eliminated and is no longer participating in the game.

Figure 8:
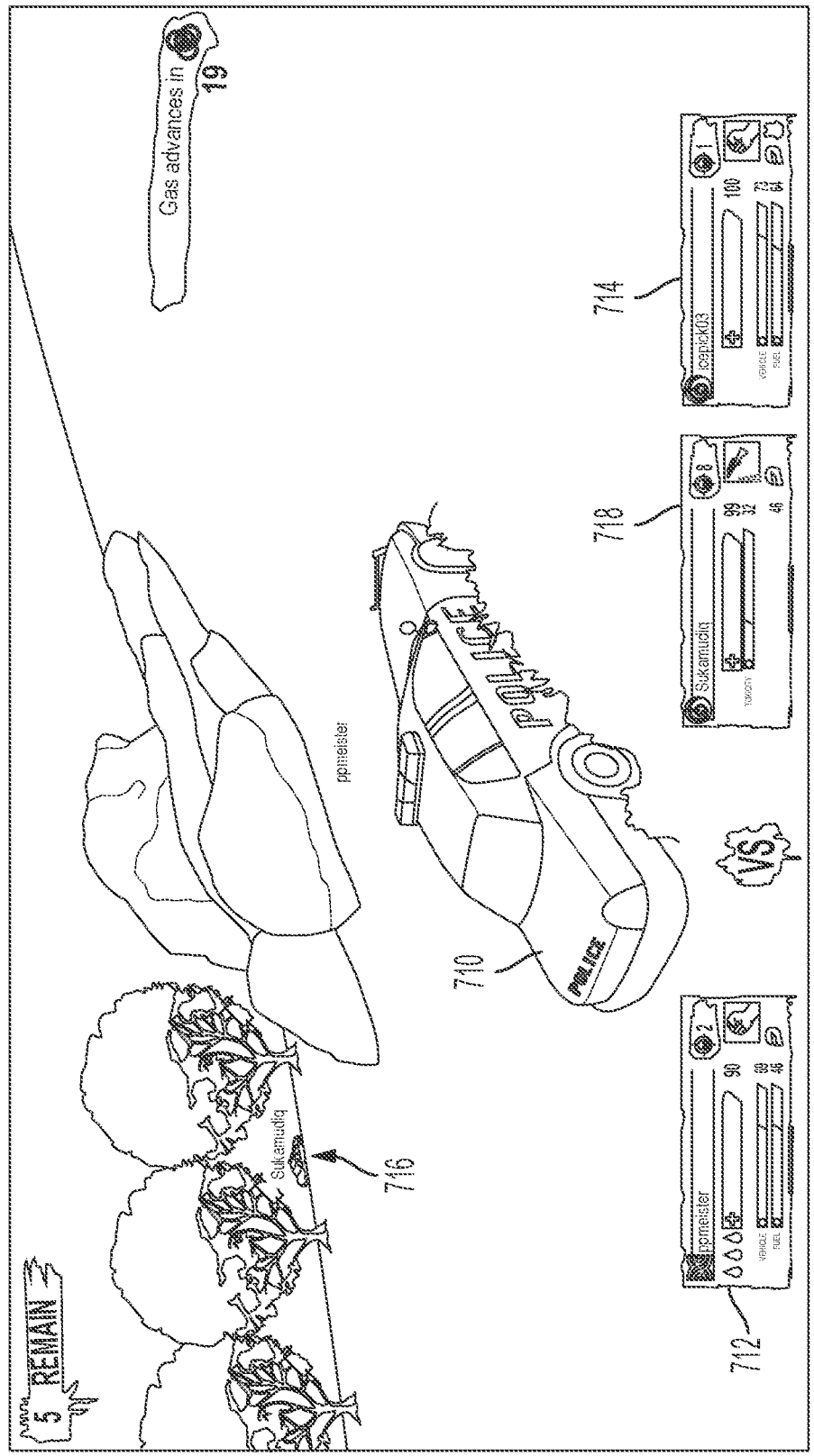

The screen shot of FIG. 8 depicts combat between three PCs. PC 1 is inside a vehicle 710 and, therefore, the system 100 conditionally shows the vehicle condition and amount of fuel in association with other information in a UI element 712 for PC 1. The PC 3 is inside another vehicle, which is not in the field of view shown in FIG. 8. Nonetheless, the system 100 conditionally shows the other vehicle condition and amount of fuel in association with a UI element 714 for PC 3. The second PC 716 is on foot (in the far background of the depicted scene). The system 100 conditionally displays information related to environmental toxicity in association with a UI element 718 for the second PC 716 because the second PC 716 has been exposed to a "toxic gas" game mechanic.

Note that FIG. 8 corresponds to a third person observer's perspective rather than the point of view (POV) perspective of any PC. In practice, the camera type, orientation, position, its mobility (fixed versus movable), and other characteristics can vary from one camera view to another, and from one embodiment to another. Moreover, the screen shot of FIG. 8 demonstrates how the system 100 can dynamically respond to a "one versus N" scenario, wherein the targeted PC is currently engaged in an altercation with more than one other character. Thus, the system 100 is capable of dynamically updating and displaying the UI element 712 for the targeted PC, along with any number of additional UI elements associated with opponent PCs.

The screen shot of FIG. 9 depicts combat between three members of three different teams. This screen shot includes a team UI element 740 that displays information related to the current state of the team members of a targeted PC 742 (the targeted character in FIG. 9), and another team UI element 744 that displays information related to the current state of the team members of a second PC (now eliminated from the game). The third PC is a member of a team for which detailed information is currently hidden—as indicated by the "+1" UI element that appears near the top of the team UI element 744. The team information for the third PC's team can optionally be revealed by selecting the "+1" UI element directly, via a keystroke, or other input method. In this regard, if other teams are involved in the displayed scene, then the UI element 744 will indicate the number of additional teams, e.g., "+2" or "+3" and so on. Depending on the particular application, display size, and other factors, it may be possible to expand a team UI element as needed to show the details of more than one team at a time. For simplicity, FIG. 9 only shows the expansion of one opposing team.

The expansion methodology described above (using a numeric "expansion" element) can also be ported for use with the player-specific UI elements that appear near the bottom of the display. Accordingly, this expansion methodology allows the system to display the current number of PCs that are interacting with the first PC, the current number of PCs engaged in combat with the first PC, etc., and enables an end user to select the expansion element to reveal more detailed information related to the other PCs.

Although not always required, the exemplary embodiment presented here displays the targeted PC's altercation UI element near the bottom left corner of the screen, and automatically displays the targeted PC's team UI element 740. Thus, in FIG. 9, the UI element 748 and the team UI element 740 are linked to the targeted PC 742. The UI element 748 displays the name of the targeted PC 742

("SickCodRush" in this example). The UI element 748 also displays an icon or logo that identifies the team of the targeted PC 742 (in FIG. 9, the team logo is displayed directly to the left of the player's name). The team logo is also reproduced in the corresponding team UI element 740 to make it easy for the viewer to identify the targeted player's team. In accordance with the dynamic nature of the system 100, if a different PC is targeted, then the display will be automatically updated to show the newly targeted PC's individual UI element and the newly targeted PC's team UI element.

It should be appreciated that the targeted PC and the enemy PCs need not be in the field of view generated by a spectator device 106; as long as a PC is targeted, the system 100 will provide the corresponding game data to the spectator device 106. For example, the operator of the spectator device 106 may use the "R" key to select the nearest PC (resulting in a display as shown in FIG. 9), and then spin the virtual camera view to face the targeted PC. As another example, the operator of the spectator device 106 may select a preset camera angle or perspective (e.g., a third person view) to bring the targeted PC into view. Accordingly, the PCs in any given scene need not necessarily be in view, or be viewable (e.g., they might be obscured by gas, smoke, or other in-game elements/objects).

Moreover, if the targeted PC is not currently engaged with another game character (there is no detected altercation), then the system 100 responds in an appropriate manner. To this end, the individual UI element for the targeted PC will appear at the bottom of the display screen, as described previously. In addition, the team UI element for the targeted PC's team will be displayed to identify the current ongoing status of the team members. By default, however, no other team UI element is displayed because the targeted PC is not currently engaged with any other game character. That said, in certain implementations, an operator of a spectator device 106 can manually select another team to initiate the display of a team UI element for the selected team.

Exemplary Use Case

Figure 10:
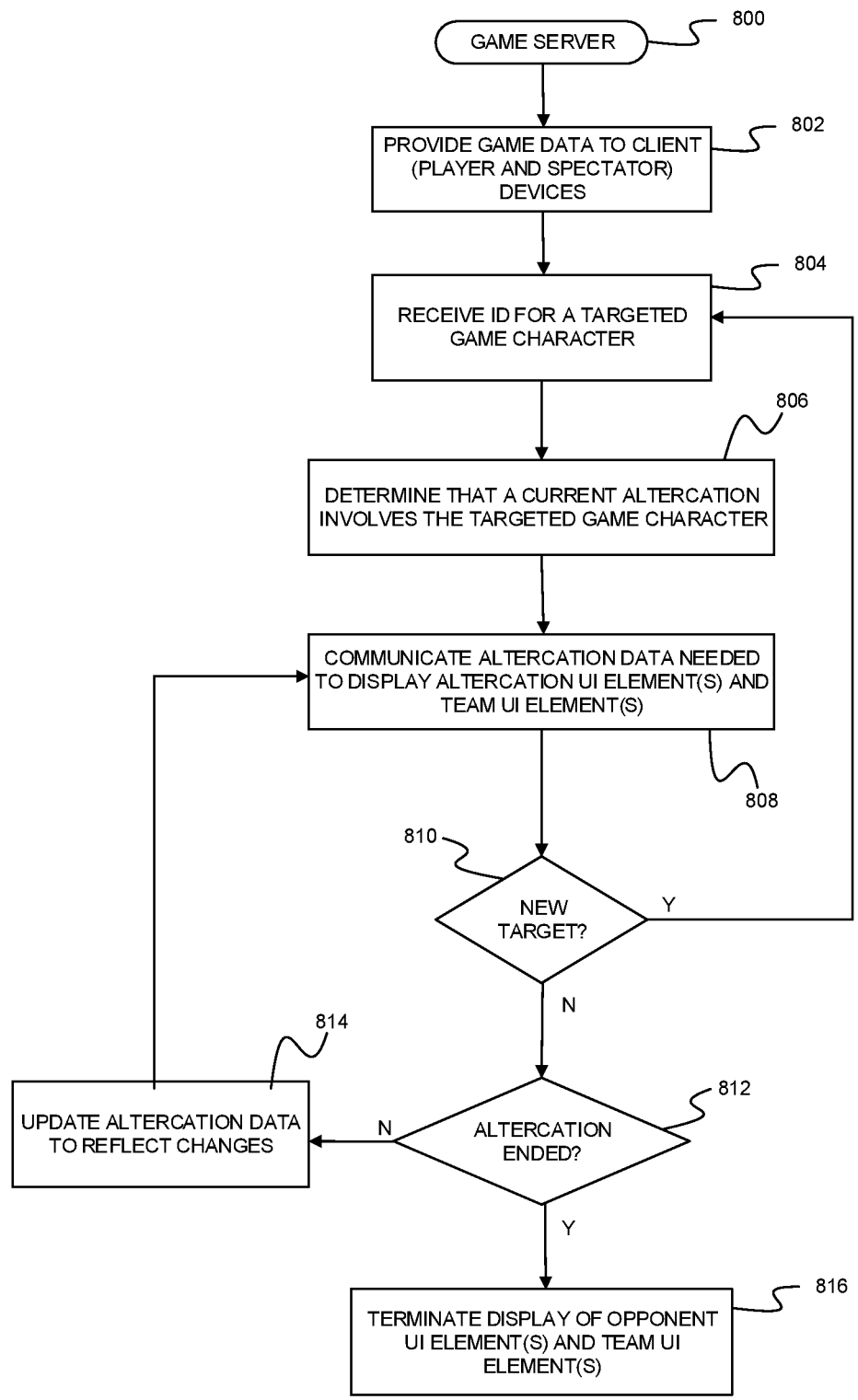
FIG. 10 is a flow chart that illustrates server-side functionality for an exemplary use case of the video game presentation system.
Figure 11:
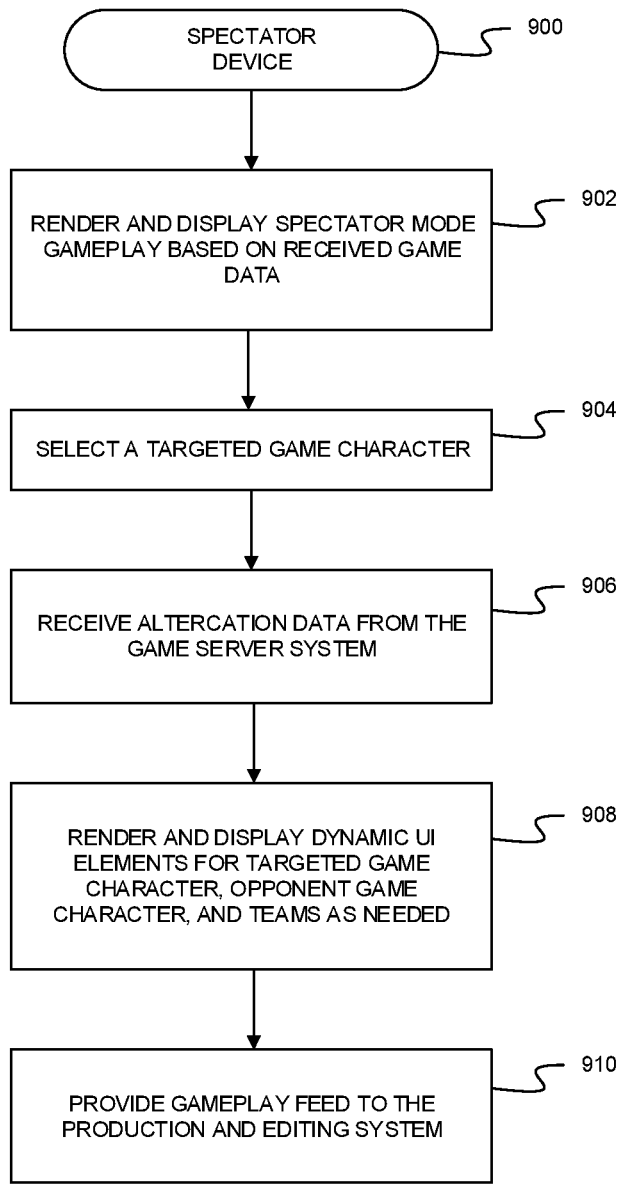
FIG. 11 is a flow chart that illustrates spectator-side functionality for an exemplary use case of the video game presentation system.

FIG. 10 is a flow chart that illustrates server-side functionality for an exemplary use case of the video game presentation system, and FIG. 11 is a flow chart that illustrates spectator-side functionality for the exemplary use case. The game server process 800 depicted in FIG. 10 and the spectator device process 900 depicted in FIG. 11 are consistent with one suitable implementation that supports the processing, generation, and display of the various screen shots shown in FIGS. 5-9. It should be appreciated that the processes 800, 900 are illustrated in a simplified and abbreviated manner to highlight certain aspects and features of the described methodology. In practice, the overall functionality of the system 100 will typically utilize a "suite" of software applications running concurrently on the various devices, and those applications will include additional functionality and features that need not be described in detail here with reference to FIGS. 5-11.

Referring to FIG. 10, the game server process 800 operates the game server to provide the necessary game data to a plurality of different client devices (task 802), including at least the active player devices and the active spectator devices in the system 100. The game data defines the multiplayer video game environment such that the client devices can receive updated/refreshed game data in an ongoing and real-time manner, process the received game data, and render the displayed game environment as appropriate for the particular viewing perspective. The game data gives the game server awareness of the ongoing status of all game characters, along with the knowledge and status of currently active altercations, predicted future altercations, etc. In contrast, however, there is usually no need for individual client devices (player devices or spectator devices) to have all of the available game data because the content displayed at any particular client device can typically be generated from only a subset (a small percentage) of the game data. For this example, task 802 provides the relevant portion of the game data to the various client devices in an ongoing manner as needed to respond to controls, commands, game character navigation, and other actions that result from end user manipulation of the client devices.

This description assumes that the game server receives a character identifier (ID) corresponding to a targeted game character (task 804). A character ID can be anything that uniquely identifies the targeted game character within the context of the game environment. In practice, the process 800 can receive a plurality of different character IDs from different spectator devices, automated logic modules, or the like. This example assumes that the game server receives the character ID from a spectator device (e.g., any client device that is operating in the spectator mode as a registered spectator). More specifically, this example assumes that the game server receives the character ID in response to a selection of the targeted game character made at the spectator device. As another example, the game server can receive the character ID in response to an automated selection or identification of the targeted game character, as mentioned previously. In accordance with an automated implementation, the determination of the targeted game character can be performed by a spectator device, by a client device, or by the game server. To this end, automated selection of the targeted game character can be performed in accordance with a higher ranking of the currently active altercation relative to other active altercations in the multiplayer video game environment. In other words, at least some of the currently active altercations can be ranked or prioritized according to predetermined criteria, wherein the targeted game character is involved in a higher ranked altercation (preferably, the highest ranked altercation). Ranking altercations in this manner is desirable to ensure that the most interesting interactions, battles, fights, and combat are monitored for use in the broadcast feed that is ultimately shown to the viewing audience.

The game server uses the character ID to check whether a currently active altercation in the multiplayer video game environment involves the targeted game character and at least one opponent game character. As mentioned above, the game server employs a set of rules, definitions, and/or criteria that dictates whether or not there is an existing "altercation" between two game characters. This example assumes that the game server determines that a currently active altercation involves the targeted game character and an opponent game character (task 806). If, however, the targeted game character is not involved in an altercation, then the process 800 may continue (not shown in FIG. 10) in an appropriate manner to initiate the display of a UI element (at the spectator device) that contains certain attributes of the targeted player. See, for example, FIG. 5, which depicts a UI element 500 corresponding to the targeted player character 502. The screen shot of FIG. 5 does not include any other game character UI elements because the targeted player character 502 is not currently engaged in an altercation.

If the process 800 determines that the targeted game character is currently involved in an altercation, then the game server initiates the generation and display of UI elements that include the respective status and attribute information for the game characters involved in the altercation. More specifically, the process 800 generates or retrieves the appropriate altercation data and communicates that altercation data from the game server system to the spectator client that selected the targeted game character (task 808). The communicated altercation data includes the data that is needed to render and display the "player versus player" UI elements at the designated spectator device. In this regard, the communicated altercation data preferably includes respective gameplay attributes to display with a first UI element associated with the targeted game character, and preferably includes respective gameplay attributes to display with a second UI element associated with the opponent game character. As a result, each game character involved in the monitored altercation will have a corresponding UI element displayed at the spectator device, with the current game character status and attribute information populated in the UI element. The screen shots of FIG. 6 and FIG. 7 are examples that depict UI elements 600, 606 displayed for the targeted character and one opponent character.

The system 100 and the game server process 800 support team play, where players are members of different teams. For example, the targeted game character can be a member of a first team of game characters, and the opponent game character can be a member of a second team of game characters. To support team play, task 808 causes or controls the display of team UI elements at the spectator device as needed. Accordingly, the process 800 initiates the display of a first team UI element that is associated with the first team (of which the targeted game character is a member) and initiates the display of a second team UI element that is associated with the second team (of which the opponent game character is a member). A team UI element may be generated and rendered as a distinct graphical element or in combination with an individual game character UI element. A team UI element includes certain gameplay attributes and/or status information of at least one member of the respective team. Although not always required, the amount of information provided in a team UI element may be condensed, abbreviated, or simplified relative to the amount of information provided in an individual game character's UI element. The screen shot of FIG. 9 is one example that depicts team UI elements 740, 744 displayed for the targeted character and one opponent character.

The foregoing description relates to a simple "one versus one" altercation. In practice, however, the system 100 and the game server process 800 support "one versus N" altercations, where N can be greater than one (although display size and resolution may place practical restrictions on N due to the limited number of altercation UI elements that can be comfortably displayed at one time). For example, task 806 may determine that the currently active altercation involves the targeted game character, the opponent game character, and a third game character (which may be another opponent in the altercation, a friendly character, or a neutral character). In such a scenario, the altercation data provided to the spectator device includes the respective gameplay attributes for all three of the game characters to facilitate the rendering and display of the corresponding UI elements (and team UI elements if applicable) at the spectator device. The screen shots of FIG. 8 and FIG. 9 are examples that depict individual game character UI elements for "one versus two" altercations.

In preferred embodiments, the altercation data that is required to generate and display the altercation UI elements and the corresponding team UI elements is distributed to client devices on an as-needed basis. Thus, although task 802 continues in an ongoing manner to support conventional gameplay processes and to send updated game data to the client devices, the altercation data that populates the altercation UI elements (individual and team) need not be sent to the player devices. Moreover, the same altercation data utilized by one spectator device need not be provided to any other spectator devices, unless for some reason two spectator devices have targeted the same game character and the system 100 lacks an arbitration or conflict resolution scheme to handle the situation.

Referring again to FIG. 10, the game server continues as described above to update and refresh the altercation UI elements in a real-time and dynamic manner. As the altercation progresses and game character status and/or attributes change, the rendered and displayed content of the altercation UI elements is refreshed to indicate any relevant changes. If a new game character is selected as a target (for the same spectator device) or if the current altercation ends, then the process 800 proceeds in an appropriate manner. To this end, after the previous altercation data has been communicated, if the game server receives a new character ID corresponding to a newly targeted game character (the "Yes" branch of query task 810, and task 804), then the methodology described above is repeated for the new character ID. Consequently, if the process 800 detects that another currently active altercation involves the newly targeted game character and a corresponding opponent game character, then the altercation UI elements are dynamically updated (or recreated) with the gameplay attributes associated with the newly targeted game character and the corresponding opponent game character. This methodology enables the game server to control the rendering of the display at each individual spectator device in a dynamic and responsive manner based on the selection of targeted game characters and their altercation status.

If a new game character has not been targeted (the "No" branch of query task 810) and the currently active altercation is still ongoing (the "No" branch of query task 812), then the game server continues as described above. The altercation data is continuously created, updated, refreshed, and deleted as needed (task 814), regardless of targeting by a spectator device. That said, if the altercation is still ongoing, then refreshed altercation data can be used to update and modify the altercation UI elements as needed. In this way, the process 800 dynamically updates the altercation data to reflect ongoing changes in the status of the currently active altercation, and communicates the dynamically updated altercation data to the spectator device as needed to provide the updated gameplay attributes for displaying with the altercation UI elements.

If, however, the game server detects that the currently active altercation has ended (the "Yes" branch of query task 812), then the process terminates the display of the UI element and team UI element associated with any opponent game character (task 816). Task 816 is preferably accomplished in an indirect manner, e.g., by deleting the altercation data that had been used to render the UI elements, which leaves the spectator device with nothing to render. The individual UI element for the targeted game character can remain displayed as a status indicator for that character, or it can also be removed. From the perspective of the spectator device, the dynamic and automatic removal of the opponent's altercation UI element serves as a visual reminder to search for a new target and/or to search the game environment for another altercation. As the game progresses, therefore, the spectator device displays, updates, removes, and replaces altercation UI elements based on target character selection, current altercation status, and game character status.

In practice, the process 800 performed by the game server can concurrently support a plurality of different spectator devices. Each spectator device can select its own targeted game character in an independent manner, and the targeted character may or may not be participating in an active altercation. Thus, multiple iterations of the process 800 can be executed as needed to handle multiple spectator devices. For example, the game server system can receive a first character ID corresponding to a first targeted game character that has been selected by a first spectator device, and also receive a second character ID corresponding to a second targeted game character that has been selected by a second spectator device (that is different than the first spectator device). In response to the two different character IDs, and assuming that respective altercations are currently active, the game server communicates first altercation data to the first spectator device and second altercation data to the second spectator device, wherein corresponding altercation UI elements are displayed at the two spectator devices.

Referring to FIG. 11, the spectator device process 900 operates the spectator device in cooperation with the game server to render and display the spectator mode gameplay action, based on the game data received from the game server (task 902). As mentioned above, the spectator mode gameplay view may differ from the player mode gameplay view because the spectator mode employs different camera views, perspectives, and features that may not be available in the normal player mode. Nonetheless, the game server and client support these different views.

Consistent with the example described above with reference to FIG. 10, the process 900 selects a targeted game character (task 904) and sends the corresponding character ID to the game server. In response to the selection of the targeted game character, the process 900 receives the applicable altercation data from the game server system (task 906). The altercation data, which includes status and attribute information for the targeted game character and any opponent game characters that are engaged in the altercation, is processed by the spectator device in an appropriate manner to render and display the dynamic altercation UI elements for the targeted game character and the opponent game character(s) and team(s) as needed (task 908).

The altercation UI elements are displayed and dynamically refreshed as needed as the gameplay progresses. In practice, the altercation UI elements are displayed as overlays concurrently with the spectator mode gameplay activity that appears on the display element of the spectator device. The process 900 may continue by providing a real-time gameplay video feed (which may be in any desired format) to the production and editing system, wherein the gameplay feed corresponds to the spectator mode gameplay activity that is viewable at the spectator device (task 910). In certain embodiments, the production and editing system captures the gameplay (including the altercation UI elements) feeds using, for example, conventional or open source video capturing tools or applications.

In practice, an iteration of the process 900 can be performed by each spectator device operating in the video game presentation system 100. Thus, a first spectator device can receive altercation data intended for it and, in response thereto, display first and second dynamic UI elements in a first gameplay feed, wherein the first UI element includes updateable gameplay attributes of a game character targeted by the first spectator device, and wherein the second UI element includes updateable gameplay attributes of an opponent game character. In addition, a second spectator device can receive altercation data intended for it and, in response thereto, display third and fourth dynamic UI elements in a second gameplay feed, wherein the third UI element includes updateable gameplay attributes of a game character targeted by the second spectator device, and wherein the fourth UI element includes updateable gameplay attributes of another opponent game character. In other words, each spectator device can independently select a target game character and independently generate and display the dynamically updateable altercation UI elements, as needed. In certain embodiments, however, the game server can syndicate all of the current altercation data to any or all client devices and outboard systems if so desired. It can be efficient and practical to provide all of the altercation data to all client devices because the altercation data is relatively lightweight and easy to communicate in a real-time manner.

The production and editing system 108 can view any or all of the feeds generated by the spectator devices. This allows an operator of the production and editing system 108 director to quickly determine which spectator feeds have ongoing altercations (simply by looking at the bottom of the display screen, where the altercation UI elements are located). Moreover, an operator of the production and editing system 108 can monitor all of the spectator feeds and select one as the broadcast feed for distribution to the viewing audience.

In accordance with certain embodiments, the game server can provide the production and editing system 108 with a list, active links, preview windows, or selectable icons that represent some or all of the ongoing altercations, regardless of the number of deployed spectator devices 106. This allows an operator of the production and editing system 108 to have more control over the feeds, and allows the operator to select an altercation for viewing, to direct a spectator device to a selected altercation, or the like.

In accordance with some embodiments, the production and editing system 108 or the game server 102 can automatically select or identify a feed for broadcast to the viewing audience. Appropriate selection criteria can be considered, including, without limitation: prioritizing combat over non-combat; prioritizing altercations that are likely to result in the elimination of a game character; prioritizing current or recently inflicted damage over damage inflicted in the past; prioritizing certain game characters (e.g., characters associated with real world celebrities, popular team members, or famous gamers); or prioritizing players with a large number of followers, subscribers, or friends—by leveraging third party statistics data.

Enhanced Features

In addition to the foundation described above, the system 100 may implement any or all of the following features and functionality if so desired.

Ranking Altercations

The system 100 can be suitably configured to rank or prioritize a plurality of detected altercations. Dynamic and automatic ranking of altercations can be very useful in deployments of the system 100 that have a limited number of spectator devices 106 and/or a limited number of human operators. For example, if a deployment of the system 100 supports only three human observers to monitor three different spectator devices 106, it will be very difficult to keep track of more than perhaps five concurrent altercations. If the number of ongoing altercations becomes unmanageable, then some of the best PC engagements might be missed.

To address this issue, the system 100 can be suitably configured to maintain and update a centralized list or active UI element that is provided to a spectator device 106 and/or to the production and editing system 108. The provided list includes at least some, and preferably all, of the currently ongoing altercations as codified and determined by the system 100. In preferred implementations, the displayed list is ranked, ordered, or otherwise prioritized in accordance with a predetermined scheme such that the "best" altercations are highlighted. For example, the altercations can be ranked based on any or all of the following aspects, without limitation: level of interest; level of excitement; amount of damage being inflicted; whether a character is close to elimination; whether a PC in the altercation is associated with a famous eSports professional, a celebrity, or the like; whether a PC in the altercation is a member of a popular team; and the number of game characters involved in the altercation.

A human operator of the production and editing system 108 can be given a ranked list of altercations to review and consult. The list can be active to allow the operator to select any listed altercation (or any game character displayed in connection with a listed altercation) to initiate launching or dispatching of a virtual camera that would otherwise correspond to the feed of a spectator device 106. In this way, the operator can select altercations and potentially monitor any number of camera views, and then select one of those camera views as the broadcast feed. Indeed, this feature can be further extended to obviate the need for spectator devices 106 and their associated human operators. In accordance with yet a further extension of this concept, the prioritized list of altercations need not be displayed to an operator. Instead, the process can be fully automated such that the system 100 ranks the current altercations, automatically selects the highest ranked altercation, and then proceeds in an appropriate manner. For example, operators of the spectator devices 106 and/or an operator of the production and editing system 108 can be notified about the identified altercation to ensure that it will be covered by at least one camera view. As another example, the system 100 can automatically target a game character involved in the highest ranked altercation and provide a corresponding camera view to a spectator device 106, the production and editing system 108, or both.

Managing Spectator Device Coverage

As described above, each couplet altercation data object corresponds to an in-game altercation between two characters, typically two PCs. In accordance with the feature presented here, a couplet altercation data object also includes or is otherwise associated with dynamically updatable data that indicates whether one (or both) of the characters is currently targeted by a registered spectator device 106. If so, the couplet altercation data object also identifies which spectator device 106 has targeted the respective character. If neither character has been targeted by a spectator device 106, then the couplet altercation data object will reflect the non-targeted status. This information can be leveraged by the system 100 in various ways. For example, the target status of the two characters can be considered for purposes of automating coverage of altercations by the spectator devices 106. To this end, if the system 100 has an "available" spectator feed (e.g., at least one of the spectator devices 106 is not currently targeting any game character, a spectator device is actively covering a lower priority altercation, or the like), and there are ongoing altercations of interest, then the system 100 should take advantage of an available spectator device 106 and use it to cover an altercation that is not already being monitored. In this context, whether or not a spectator feed is "available" can be dictated by any desired criteria.

Rules can be implemented for purposes of assigning spectator devices 106 to altercations or game characters. As a simple example, assume that: there are only two ongoing battles; each of the two battles is currently being monitored by a different spectator device 106; and there remains one available spectator device 106 that has not yet targeted a game character. In this scenario, the system 100 can be controlled to assign the available spectator device 106 such that a second character in one of the ongoing battles is also targeted. Thus, both characters in one of the two battles will be targeted by different spectator devices 106. The rules utilized by the system 100 can dictate which character to target in this situation: target the character that is closer to elimination; target a character linked to a famous real life celebrity or eSports personality; target the character having the most health; target a character driving a vehicle; or the like.

Along these same lines, even if human operators are employed at the spectator devices 106, the system 100 can rank altercations (as mentioned above) and automatically update a spectator device 106 to switch from a current target to a new target. Alternatively, the system 100 can determine that a highly ranked altercation is not currently being monitored and, in response to that determination, communicate an active link or a recommendation to a spectator device 106 in an attempt to direct the operator of that spectator device 106 to the desired altercation. Thereafter, the operator can target a game character that is involved in the identified altercation and assume control of the virtual camera as usual. This semi-automatic methodology makes it easier for human operators to locate the best altercations, which is particularly advantageous in a battle royale game environment.

Second Screen Experience

As explained above, the multiplayer game server 102 maintains awareness of all altercations, the ongoing status of game characters, and other gameplay information. Consequently, the game server 102 can leverage the game related information and status data to support additional features and functions. For example, the system 100 can automatically save replays of all altercations for future playback, to facilitate creation of a condensed version of the gameplay, to provide alternative camera angles to operators and/or the viewing audience, or the like.

As another example, the system 100 can utilize the game data to create a second screen experience or portal for the viewing audience. Thus, the primary live broadcast feed can be provided via a traditional broadcast or streaming network, while additional information and links to ongoing in-game altercations can be provided via a suitably formatted and configured web site. In this regard, the altercation data can be utilized to generate an online (web based) UI that includes a real-time summary of altercations, who is fighting who, etc. In certain implementations, the second screen UI includes a comprehensive list of all current altercations, which inherently identifies which game characters remain active in the game environment, and which game characters are currently engaged in an altercation. The list can include active links that allow the end users to select which altercations to view, using the web page as a portal for the various gameplay feeds. In practice, this feature can leverage the available camera views of the spectator devices 106 and enable the viewers to select any of the altercations that appear in the list.

The various tasks performed in connection with a process described herein may be performed by software, hardware, firmware, or any combination thereof. In practice, portions of a described process may be performed by different elements of the described system 100, e.g., the game server 102, a player device 104, a spectator device 106, or the production and editing system 108. It should be appreciated that a described process may include any number of additional or alternative tasks, the tasks shown in a figure need not be performed in the illustrated order, and a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing a live broadcast of multiplayer video game activity, the method comprising the steps of:
   operating a computer-based multiplayer game server system to provide game data to a plurality of computer-based client devices, the game data defining a multiplayer video game environment that includes a plurality of game characters;
   generating, with the computer-based multiplayer game server system, a couplet altercation data object for a currently active altercation in the multiplayer video game environment, the currently active altercation involving a targeted game character and an opponent game character, the couplet altercation data object comprising altercation data that characterizes and defines the currently active altercation;
   maintaining and updating the couplet altercation data object, with the computer-based multiplayer game server system, while the targeted game character and the opponent game character are actively engaged in the currently active altercation;
   receiving, at the computer-based multiplayer game server system, a character identifier corresponding to the targeted game character;
   communicating altercation data included in the couplet altercation data object, from the computer-based multiplayer game server system to a computer-based client device operating in a spectator mode, the altercation data comprising first gameplay attributes to display with a first user interface (UI) element associated with the targeted game character, and further comprising second gameplay attributes to display with a second UI element associated with the opponent game character; and
   deleting the couplet altercation data object from resident memory of the computer-based multiplayer game server system, when the targeted game character and the opponent game character are no longer actively engaged in the currently active altercation.

2. The method of claim 1, further comprising the steps of:
   dynamically updating the couplet altercation data object to reflect changes in status of the currently active altercation, resulting in dynamically updated altercation data; and
   communicating the dynamically updated altercation data from the computer-based multiplayer game server system to the computer-based client device operating in the spectator mode, the dynamically updated altercation data comprising updated gameplay attributes to display with the first UI element, the second UI element, or both the first UI element and the second UI element.

3. The method of claim 1, wherein the receiving step receives the character identifier from the computer-based client device operating in the spectator mode.

4. The method of claim 3, wherein the couplet altercation data object is updated to identify the computer-based client device operating in the spectator mode as a targeting spectator device.

5. The method of claim 1, wherein the receiving step receives the character identifier in response to automated selection of the targeted game character.

6. The method of claim 1, wherein the deleting step deletes the couplet altercation data object when more than a predetermined amount of time has passed since the targeted game character or the opponent game character has inflicted damage.

7. The method of claim 1, wherein the deleting step deletes the couplet altercation data object when more than a predetermined amount of time has passed since the targeted game character or the opponent game character has suffered damage.

8. The method of claim 1, wherein the deleting step deletes the couplet altercation data object when a distance in the multiplayer video game environment between the targeted game character and the opponent game character is more than a predetermined distance.

9. A computer-based multiplayer game server system comprising a memory element and a processor device communicatively coupled to the memory element, the memory element having computer executable instructions stored thereon and configurable to be executed by the processor device to cause the computer-based multiplayer game server system to:
   provide game data to a plurality of computer-based client devices, the game data defining a multiplayer video game environment that includes a plurality of game characters;
   generate, with the computer-based multiplayer game server system, a couplet altercation data object for a currently active altercation in the multiplayer video game environment, the currently active altercation involving a targeted game character and an opponent game character, the couplet altercation data object comprising altercation data that characterizes and defines the currently active altercation;
   maintain and update the couplet altercation data object while the targeted game character and the opponent game character are actively engaged in the currently active altercation;

receive a character identifier corresponding to the targeted game character;

communicate altercation data included in the couplet altercation data object, from the computer-based multiplayer game server system to a computer-based client device operating in a spectator mode, the altercation data comprising first gameplay attributes to display with a first user interface (UI) element associated with the targeted game character, and further comprising second gameplay attributes to display with a second UI element associated with the opponent game character; and delete the couplet altercation data object from resident memory of the computer-based multiplayer game server system, when the targeted game character and the opponent game character are no longer actively engaged in the currently active altercation.

10. The computer-based multiplayer game server system of claim 9, wherein the computer-executable instructions are configurable to cause the computer-based multiplayer game server system to:

dynamically update the couplet altercation data object to reflect changes in status of the currently active altercation, resulting in dynamically updated altercation data; and communicate the dynamically updated altercation data to the computer-based client device operating in the spectator mode, the dynamically updated altercation data comprising updated gameplay attributes to display with the first UI element, the second UI element, or both the first UI element and the second UI element.

11. The computer-based multiplayer game server system of claim 9, wherein the game server system receives the character identifier from the computer-based client device operating in the spectator mode.

12. The computer-based multiplayer game server system of claim 11, wherein the couplet altercation data object is updated to identify the computer-based client device operating in the spectator mode as a targeting spectator device.

13. The computer-based multiplayer game server system of claim 9, wherein the game server system receives the character identifier in response to automated selection of the targeted game character.

14. The computer-based multiplayer game server system of claim 9, wherein the game server system deletes the couplet altercation data object when more than a predetermined amount of time has passed since the targeted game character or the opponent game character has inflicted damage.

15. The computer-based multiplayer game server system of claim 9, wherein the game server system deletes the couplet altercation data object when more than a predetermined amount of time has passed since the targeted game character or the opponent game character has suffered damage.

16. The computer-based multiplayer game server system of claim 9, wherein the game server system deletes the couplet altercation data object when a distance in the multiplayer video game environment between the targeted game character and the opponent game character is more than a predetermined distance.

* * * * *